US012639614B2

(12) United States Patent
McEwen

(10) Patent No.: US 12,639,614 B2
(45) Date of Patent: May 26, 2026

(54) FUSING LOGICAL QUBITS TO IMPLEMENT TRANSVERSAL MULTI-QUBIT GATES IN FAULT-TOLERANT QUANTUM COMPUTING SYSTEMS

(71) Applicant: Google LLC, Mountain View, CA (US)

(72) Inventor: Matthew James McEwen, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 32 days.

(21) Appl. No.: 18/934,800

(22) Filed: Nov. 1, 2024

(65) Prior Publication Data

US 2026/0127480 A1 May 7, 2026

(51) Int. Cl.
*G06N 10/70* (2022.01)
*G06N 10/20* (2022.01)
*G06N 10/40* (2022.01)
(52) U.S. Cl.
CPC ............. *G06N 10/70* (2022.01); *G06N 10/20* (2022.01); *G06N 10/40* (2022.01)
(58) Field of Classification Search
CPC ......... G06N 10/70; G06N 10/20; G06N 10/40
USPC .................. 326/7; 257/31; 708/105; 714/10; 706/62
See application file for complete search history.

(56) References Cited

U.S. PATENT DOCUMENTS 10,141,006 B1 11/2018 Burciu

FOREIGN PATENT DOCUMENTS

CN 107516511 12/2017
CN 109392309 2/2019
WO WO-2025096766 A1 * 5/2025 ............. G06N 10/20

OTHER PUBLICATIONS

Ang et al., "Architectures for Multinode Superconducting Quantum Computers", arXiv:2212.06167v1, Dec. 12, 2022, 41 pages.
Bluvstein et al., "A Quantum Processor Based on Coherent Transport of Entangled Atom Arrays", Nature, vol. 604, Apr. 20, 2022, 21 pages.
Bravyi et al., "Quantum Codes on a Lattice with Boundary", arXiv: quant-ph/9811052v1, Nov. 20, 1998.
Breuckmann, "Homological Quantum Codes Beyond the Toric Code", RWTH Aachen University, Master of Science Physics Dissertation, Nov. 2017, 191 pages.

(Continued)

*Primary Examiner* — Arnold M Kinkead
(74) *Attorney, Agent, or Firm* — DORITY & MANNING P.A.

(57) ABSTRACT

A method for operating a fault-tolerant quantum computing system (QCS), which includes a first set of physical qubits (PQs) that forms a first logical qubit (LQ) and a second set of PQs that forms a second LQ, is disclosed. A first subset of the first set of PQs is entangled with a second subset of the second set of PQs, forming a first set of entangled qubit-pairs. The entangled qubit-pairs are distributed across the first subset of PQs and the second subset of PQs. A fused LQ is formed that includes the first LQ, the second LQ is formed, and a set of fused stabilizers that spans the first LQ and the second LQ. The entangled qubit-pairs are employed as fused-measure qubits for the set of fused stabilizers. A quantum error correction (QEC) code is implemented on the fused LQ. The QEC code employs the fused stabilizers.

20 Claims, 10 Drawing Sheets

(56)         References Cited

OTHER PUBLICATIONS

Burkhart et al., Error-Detected State Transfer and Entanglement in a Superconducting Quantum Network, PRX Quantum, vol. 2, Issue 3, Aug. 2021, 27 pages.

Campbell, "Distributed Quantum Information Processing with Minimal Local Resources", arXiv:0704.1464v3, Oct. 9, 2007, 5 pages.

Cetina et al., "Quantum Gates on Individually-Addressed Atomic Qubits Subject to Noisy Transverse Motion", arXiv:2007.06768v1, Jul. 14, 2020, 6 pages.

Delaney et al., Superconducting-Qubit Readout via Low-Backaction Electro-Optic Transduction, Nature, vol. 606, Jun. 15, 2022, 17 pages.

Dennis et al., "Topological Quantum Memory", arXiv: quant-ph/0110143v1, Oct. 24, 2001, 39 pages.

Dumer et al., "Thresholds for Correcting Errors, Erasures, and Faulty Syndrome Measurements in Degenerate Quantum Codes", Physical Review Letters, vol. 115, Jul. 31, 2015, 6 pages.

Dür et al., "Entanglement Purification for Quantum Computation", arXiv: quant-ph/0210069v2, Feb. 17, 2003, 4 pages.

Fowler et al., "Surface Code Quantum Communication", arXiv:0910.4074v3, Feb. 5, 2010, 4 pages.

Fowler et al., "Surface Codes: Towards Practical Large-Scale Quantum Computation", Physical Review A, vol. 86, 2012, 48 pages.

Freedman et al., "Projective Plane and Planar Quantum Codes", arXiv: quant-ph/9810055v1, Oct. 18, 1998, 7 pages.

Fujii et al., "A Distributed Architecture for Scalable Quantum Computation with Realistically Noisy Devices", arXiv:1202.6588v1, Feb. 29, 2012, 11 pages.

Google Quantum AI, "Quantum Computer Datasheet", May 14, 2021, 6 pages.

Google Research, "A Preview of Bristlecone, Google's New Quantum Processor", Mar. 5, 2018, https://research.google/blog/a-preview-of-bristlecone-googles-new-quantum-processor/, retrieved on May 28, 2025, 5 pages.

Gottesman et al., "Demonstrating the Viability of Universal Quantum Computation using Teleportation and Single-Qubit Operations", Nature, vol. 402, Nov. 25, 1999, pp. 390-393.

Higgot, "PyMatching: A Python Package for Decoding Quantum Codes with Minimum-Weight Perfect Matching", arXiv:2105.13082v2, Jul. 12, 2021, 15 pages.

Horsman et al., "Surface Code Quantum Computing by Lattice Surgery", arXiv:1111.4022v3, Feb. 21, 2013, 29 pages.

IBM, "IBM Unveils 400 Qubits-Plus Quantum Processor and Next-Generation IBM Quantum System Two", Nov. 9, 2022, https://newsroom.ibm.com/2022-11-09-IBM-Unveils-400-Qubit-Plus-Quantum-Processor-and-Next-Generation-IBM-Quantum-System-Two, retrieved on Jun. 24, 2025, 5 pages.

IBM," What's Next in Quantum is Quantum-Centric Supercomputing" https://research.ibm.com/quantum-computing, 2023, retrieved on Dec. 9, 2025, 6 pages.

Imany et al., "Quantum Phase Modulation with Acoustic Cavities and Quantum Dots", Optica, vol. 9, Issue 5, 2022, pp. 501-504.

IonQ, "IonQ Aria", https://ionq.com/quantum-systems/aria, retrieved on Dec. 12, 2025, 7 pages.

Jiang et al., "Distributed Quantum CoGGLQ-200mputation based on Small Quantum Registers", Physical Review A, vol. 76, Issue 6, 2007, 22 pages.

Kitaev, "Fault-Tolerant Quantum Computation by Anyons", arXiv:quant-ph/9707021v1, Jul. 9, 1997, 27 pages.

Krastanov et al., "Optimized Entanglement Purification", arXiv:1712.09762v3, Feb. 14, 2019, 18 pages.

Li et al., "High Threshold Distributed Quantum Computing with Three-Qubit Nodes", arXiv:1204.0443v2, May 5, 2012, 12 pages.

Magnard et al., "Microwave Quantum Link Between Superconducting Circuits Housed in Spatially Separated Cryogenic Systems", arXiv:2008.01642v1, Aug. 4, 2020, 13 pages.

Moehring et al., "Entanglement of Single-Atom Quantum Bits at a Distance", Nature, vol. 449, Sep. 6, 2007, 5 pages.

Monroe et al., "Large Scale Modular Quantum Computer Architecture with Atomic Memory and Photonic Interconnects", arXiv:1208.0391v2, Jul. 2, 2013, 16 pages.

Muralidharan et al., "Optimal Architectures for Long Distance Quantum Communication", Scientific Reports, vol. 6, Feb. 15, 2016, 10 pages.

Nickerson et al., "Freely Scalable Quantum Technologies Using Cells of 5-to-50 Qubits with Very Lossy and Noisy Photonic Links", Physical Review X, vol. 4, Issue 4, Dec. 2014, 17 pages.

Nickerson et al., "Topological Quantum Computing with a Very Noisy Network and Local Error Rates Approaching One Percent", Nature Communications, vol. 4, No. 1756, Apr. 23, 2023, 5 pages.

Nigmatullin et al., Minimally Complex Ion Traps as Modules for Quantum Communication and Computing, New Journal of Physics, vol. 18, Oct. 19, 2016, 21 pages.

Pino et al., "Demonstration of the Trapped-Ion Quantum-CCD Computer Architecture", arXiv:2003.01293v4, Apr. 9, 2021, 11 pages.

Ramette et al., "Fault-Tolerant Connection of Error-Corrected Qubits with Noisy Links", arXiv:2302.01296v1, Feb. 2, 2023, 14 pages.

Reiserer et al., "Cavity-Based Quantum Networks with Single Atoms and Optical Photons", arXiv:1412.2889v2, Jul. 28, 2015, 46 pages.

Saffman, "Quantum Computing with Atomic Qubits and Rydberg Interactions: Progress and Challenges", Journal of Physics B: Atomic, Molecular, and Optical Physics, vol. 49, 2016, 28 pages.

Saffman, "Quantum Computing with Neutral Atoms", National Science Review, vol. 6, No. 1, 2019, 2 pages.

Sahu et al., "Quantum-Enabled Operation of a Microwave-Optical Interface", Nature Communications, vol. 13, No. 1276, Mar. 11, 2022, 7 pages.

Shor, Scheme for Reducing Decoherence in Quantum Computer Memory, Physical Review A, vol. 52, Issue 4, Oct. 1995, 4 pages.

Stephenson et al., "High-Rate, High-Fidelity Entanglement of Qubits Across an Elementary Quantum Network", arXiv:1911.10841v2, May 13, 2020, 11 pages.

Strikis et al., "Quantum Computing is Scalable on a Planar Array of Qubits with Fabrication Defects", Physical Review Applied, vol. 19, Jun. 29, 2023, 18 pages.

Tu et al., "High Efficiency Coherent Microwave-to-Optics Conversation via Off-Resonant Scattering", arXiv:2203.04178v1, Mar. 8, 2022, 13 pages.

Tuckett, "Tailoring Surface Codes for Highly Biased Noise", Physical Review, vol. 9, No. 4, 2019, 22 pages.

Yan et al., "Entanglement Purification and Protection in a Superconducting Quantum Network", Physical Review Letter, vol. 128, Issue 8, Feb. 2022, 7 pages.

Zhong et al., "Deterministic Multi-Qubit Entanglement in a Quantum Network", arXiv:2011.13108v1, Nov. 26, 2020, 38 pages.

Zhu et al., "Waveguide Cavity Optomagnonics for Microwave-to-Optics Conversion", Optica, vol. 7, Issue 10, 2010, 7 pages.

* cited by examiner

800

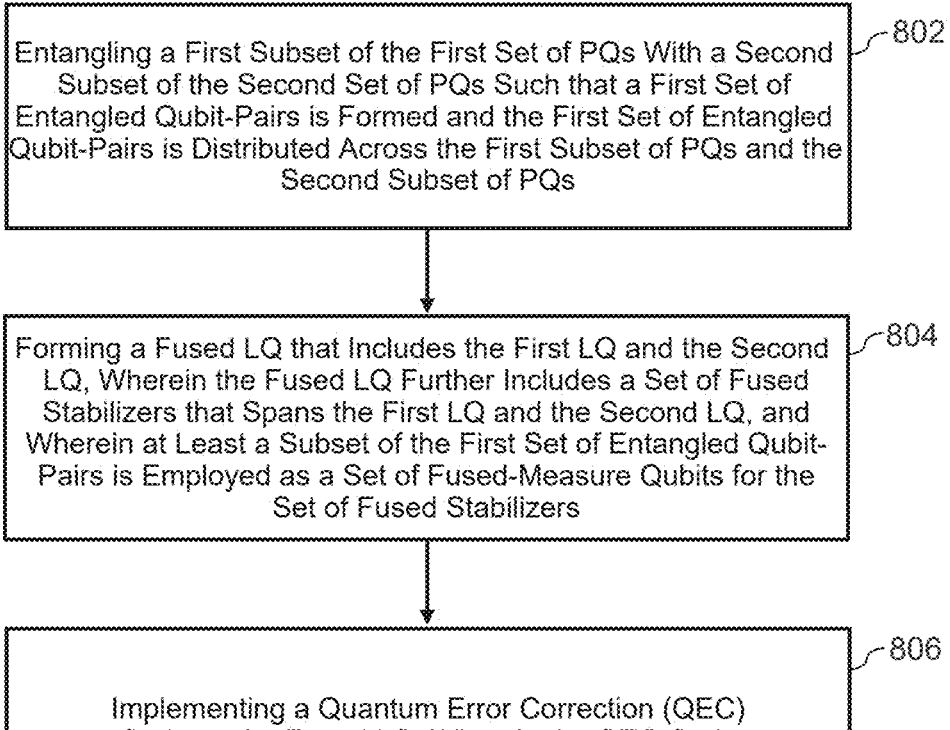

Entangling a First Subset of the First Set of PQs With a Second Subset of the Second Set of PQs Such that a First Set of Entangled Qubit-Pairs is Formed and the First Set of Entangled Qubit-Pairs is Distributed Across the First Subset of PQs and the Second Subset of PQs — 802

Forming a Fused LQ that Includes the First LQ and the Second LQ, Wherein the Fused LQ Further Includes a Set of Fused Stabilizers that Spans the First LQ and the Second LQ, and Wherein at Least a Subset of the First Set of Entangled Qubit-Pairs is Employed as a Set of Fused-Measure Qubits for the Set of Fused Stabilizers — 804

Implementing a Quantum Error Correction (QEC) Code on the Fused LQ, Wherein the QEC Code Employs the Set of Fused Stabilizers — 806

FIG. 8

FUSING LOGICAL QUBITS TO IMPLEMENT TRANSVERSAL MULTI-QUBIT GATES IN FAULT-TOLERANT QUANTUM COMPUTING SYSTEMS

FIELD

The present disclosure relates generally to quantum computing and information processing systems, and more particularly to fusing logical qubits to implement transversal multi-qubit gates in fault-tolerant quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle+b\,|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for operating a fault-tolerant quantum computing system (QCS). The QCS includes a first set of physical qubits (PQs) that forms a first logical qubit (LQ). The QCS further includes a second set of PQs that forms a second LQ. The method includes entangling a first subset of the first set of PQs with a second subset of the second set of PQs. A first set of entangled qubit-pairs is formed by entangling the first subset of PQ and the second set of PQs. The first set of entangled qubit-pairs is distributed across the first subset of PQs and the second subset of PQs. A fused LQ that includes the first LQ and the second LQ is formed. The fused LQ further includes a set of fused stabilizers that spans the first LQ and the second LQ. At least a subset of the first set of entangled qubit-pairs is employed as a set of fused-measure qubits for the set of fused stabilizers. A quantum error correction (QEC) code is implemented on the fused LQ. The QEC code employs the set of fused stabilizers.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 8 depicts a flow chart diagram of an example method for operating a fault-tolerant quantum computing system, according to various embodiments.

DETAILED DESCRIPTION

Figure 1:
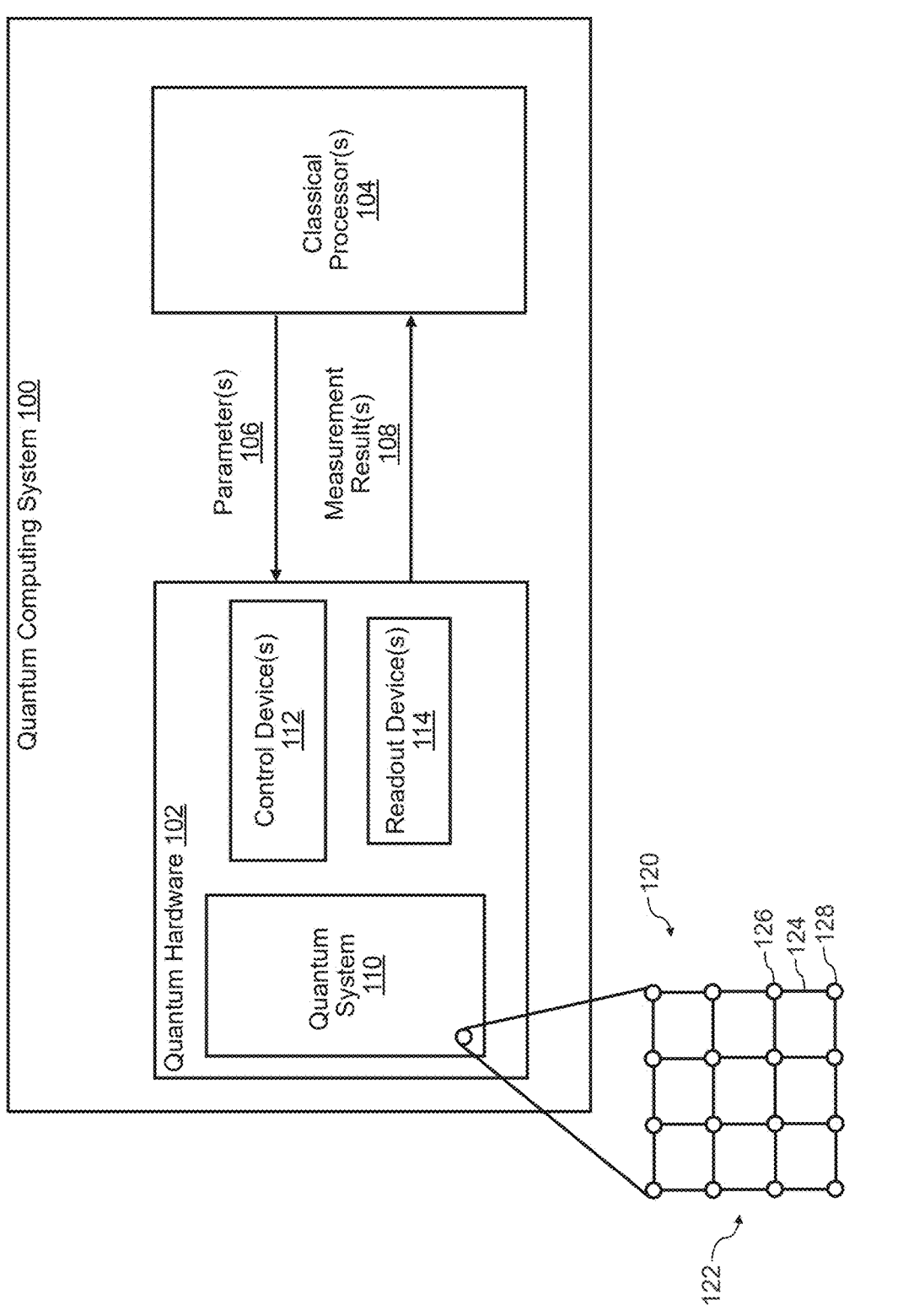
FIG. 1 depicts an example quantum computing system according to example embodiments of the present disclosure.

Example aspects of the present disclosure are directed to methods, architectures, and hardware configurations that enable fusing logical qubits (LQs). For example, quantum error correction (QEC) codes form LQs from multiple physical qubits (PQs), where the PQs redundantly encode the quantum information. Somewhat similar to classical error correction (CEC) codes, this redundant encoding of quantum information provides for detecting and correcting qubit errors. More particularly, redundantly encoding quantum information provides for "quantum" parity checks via the formation of stabilizers across a LQ.

Universal quantum computing may require multi-qubit logic gates (e.g., CNOT gates). In order to reduce qubit errors, it may be desirable to keep physical qubit-qubit interactions "local." That is, to decrease decoherence in the qubits, some quantum computing systems (QCSs) may constrain qubit-qubit interactions to be local in nature. The concept of a transversal multi-qubit gate includes applying a multi-qubit logic to two or more LQs that are in turn formed from PQs, where the PQs of the two or more LQs are not local. However, the embodiments are directed towards fusing two or more LQs into a single fused LQ. Once two or more LQs are fused into a single fused LQ, a transversal multi-qubit (e.g., a CNOT gate) gate may be implemented across the two or more LQs (while keeping the physical qubit-qubit interactions local), enabling fault-tolerance in QCSs. More specifically, QEC codes are employed to form sets of LQs from separate subsets of physical qubits (PQs). Such QEC codes include, but are not limited to, topological surface codes. A first LQ may be implemented on a first device (e.g., a first chip, die, or module) and a second LQ may be implemented on a second device (e.g., a second chip, die, or module) that is physically separate from the first device. Note that the modules need not be physically separate devices. For instance, the first module may include a first set of PQs and the second module may include a second set of PQs, where each of the first set of PQs and the second set of PQs may be integrated on a single device.

The two modules may be coupled via a set of quantum transmission lines (QTLs) that enable the transmission of quantum information (e.g., quantum states) encoded in the PQs from one of the modules to the other module. As discussed throughout, transmitting quantum information between the two modules provides for the ability to entangle PQs in the two separate LQs. Through such entanglement across the two LQs, a fused LQ that includes the two LQs may be formed. Via the entanglement, the QEC may be implemented across the entirety of the fused LQ (including the PQs that implement each of the two LQs). By forming the fused LQ that includes the first LQ and the second LQ, a transversal multi-qubit gate (e.g., a CNOT gate) may operate on the first LQ and the second LQ. Via the entanglement across the two LQs, all (physical) qubit-qubit interactions may remain local. The combination of the QEC code and conserving locality of qubit-qubit interactions provides for a reduction in LQ error rates, which results in fault-tolerance in the QCS.

The PQs integrated on a device may be arranged in a 2D lattice (or 2D array). Depending on the details of the QEC code, a LQ may include a square "patch" of PQs. Approximately half of the PQs in the patch are "data" qubits that redundantly encode quantum information (e.g., quantum information for computing and/or memory applications). The other approximate half of the PQs in the patch are "measure" qubits. The data and measure qubits are arranged into a set of "stabilizers" for the LQ. Stabilizers are employed to stabilize the parity of the groups of PQs. Briefly, each stabilizer of the set of stabilizers is formed by two or more data qubits and a single measure qubit. Because at least some qubit errors may be viewed as unwanted rotations around a Bloch-sphere, the QEC code may require at least two types of stabilizers (e.g., to detect rotations around two orthogonal axes of the Bloch-sphere). Although the embodiments are not so limited, Pauli-error channels may be considered in the embodiments (e.g., X-type errors, Z-type errors, and Y-type errors). As a review, X-type errors include a π rotation about the X-basis axis and may be referred to as bit-flip errors since they cause an eigenstate flip in the Z-basis (e.g., the computational basis). Z-type errors include a π rotation about the Z-basis axis and may be referred to as phase-flip errors since they cause an eigenstate flip in the X-basis (e.g., the Hadamard basis). Y-type errors include a π rotation about the Y-basis axis.

Note that other qubit error types, including multi-qubit error mechanisms may also be considered in the QEC codes and the embodiments. Of the three Pauli-error types, any two may be chosen as "fundamental," in that they define a 2D orthonormal-basis on the Bloch sphere, while the third error type may be considered as a composite of the other two. Without loss of generality, the Z-basis (e.g., the computational basis) and the X-basis (e.g., the Hadamard basis) may be selected as the two basis to form the orthonormal-basis, while the Y-basis is the composite basis. The Z-basis eigenstates are found at the two antipodal points on the Bloch-sphere defined by the Z-axes. The X-basis eigenstates are found at the two antipodal points on the Bloch-sphere defined by the X-axes. The Y-basis eigenstates are found at the two antipodal points on the Bloch-sphere defined by the Y-axes. Thus, although the embodiments may vary, the discussion throughout assumes X-type stabilizers and Z-type stabilizers are present.

For each stabilizer, the parity (e.g., X-type parity or Z-type parity) of the stabilizer's two or more data qubits are projected onto the stabilizer's measure qubit. Via non-destructive projective measurements on the measure qubits, various qubit error signatures may be detected and corrected. For instance, Z-type stabilizers are configured to detect "flips" in an X-type parity of the stabilizer's (data and measure) PQs, while X-type stabilizers are configured to detect "flips in a Z-type parity of the stabilizer's (data and measure) PQs. Thus, Z-stabilizers detect X-type errors (e.g., bit-flip errors), while X-type stabilizers detect Z-type errors (e.g., phase-flip errors). Other rotations of the qubit's state may be modeled as a linear combination of X-type and Z-type rotations.

Because an LQ is formed via a square patch of PQs, each LQ may include a set of boundaries (or edges). For surface codes, the boundaries may include measure qubits (e.g., boundary-measure qubits). For each LQ, a set of (physical) "transmission" qubits may be arranged "outside" at least one boundary of the patch, and adjacent to the boundary-measure qubits, forming the at least one boundary. The transmission qubits and the boundary measure qubits may be configured for local qubit-qubit interactions. Fusing the two LQs may be performed along a first boundary of the first LQ and a second boundary of the second LQ. Thus, it may be said that the first LQ is fused with the second LQ by sewing (or stitching) the first boundary of the first LQ to the second boundary of the second LQ. When forming a fused LQ, this sewing or stitching together of the two LQs may form a "seam" at the two boundaries. More specifically, a first set of boundary-measure qubits of the first LQ may form the first boundary of the first LQ and a second set of boundary-measure qubits may form the second boundary of the second LQ. As discussed throughout, fusing, sewing, or stitching the two boundaries together includes entangling the first set of boundary-measure qubits of the first LQ with the second set of boundary-measure qubits of the second LQ.

To entangle the two sets of boundary-measure qubits, a separate set of (physical) transmission qubits is associated with each of the two LQs. More specifically, a first set of transmission qubits is positioned adjacent to the first boundary of the first LQ and may be coupled via a set of QTLs to a second set of transmission qubits that is positioned adjacent to the second boundary of the second LQ. The set of QTLs are configured to transmit quantum information (e.g., quantum states) between the first and second sets of transmission qubits. Also, the first set of boundary-measure qubits are configured for local qubit-qubit interactions with the first set of transmission qubits. Likewise, the second set of boundary-measure qubits are configured for local qubit-qubit interactions with the second set of transmission qubits. As discussed throughout, via such arrangements, the first set of boundary-measure qubits may be entangled with the second set of boundary-measure qubits. Such entanglements between a subset of the PQs of the first LQ and a subset of the PQs of the second LQ provides for the formation of the fused LQ, where the qubit-qubit interactions across the PQs of the fused LQ remain local in nature. More specifically, a first boundary-measure qubit from the first LQ and a second boundary-measure qubit from the second LQ may be entangled, such that the tensor product of the wavefunctions of the two qubits are entangled, forming a non-decomposable single wave function. The entangled qubit pair of measure qubits may be employed to form a "fused" stabilizer that spans the two LQs. The fused stabilizers enable a QEC code to be implemented across the two LQs (e.g., across the entirety of the fused LQ).

In some embodiments, the transmission of quantum information (which is employed to provide the entanglement between the two LQs) over the set of QTLs may be uni-directional (e.g., quantum states encoded in PQs integrated on the second device are transmitted to and encoded on PQs integrated on the first device). In other embodiments, the transmission of quantum information may be bi-directional (e.g., quantum states encoded in PQs integrated on the first device are quantum-mechanically swapped (or exchanged) with quantum states encoded in PQs integrated on the second device). Note that the embodiments do not require that the PQs of the separate LQs be integrated on physical separate devices). For instance, the two separate LQs may be implemented on a single device, where separate sets of PQs (integrated on the single device) are employed to form the separate LQs. In such embodiments, the set of QTLs may not be required. That is, in embodiments where the first set of transmission qubits is configured for qubit-qubit interactions with the second set of transmission qubits, the set of QTLs may not be needed to generate the entanglement between the first set of boundary-measure qubits and the second set of boundary-measure qubits. For instance, in embodiments where the PQs for both LQs are integrated on the same device, the first set of transmission qubits may be adjacent to the second set of transmission qubits, and thus the first set of transmission qubits and the second set of transmission qubits are configured for local interactions.

As shown below, the embodiments include three separate quantum circuits (and variants of each of the three circuits) that provide for stitching (or fusing) of LQs between modules using the transmission of quantum information as discussed above. The three circuits present different tradeoffs in terms of hardware and connectivity they demand, but also in the benefits they provide. The first circuit (e.g., see the first quantum circuit 500 of FIG. 5) adds minimal complexity to the surface code circuit. The second circuit (e.g., see the second quantum circuit 600 of FIG. 6) adds additional 'flag' checks, which detect errors and improve the fault-tolerance of the circuit. The third circuit (e.g., see the third quantum circuit 700 of FIG. 7) halves the amount of hardware required to implement the interconnect, permitting significantly increased connectivity at the logical level.

Each of these three circuits may be implemented on a QCS. The QCS may include a first set of PQs that forms a first LQ. The QCS may additionally include a second set of PQs that forms a second LQ. Each of the three circuits is configured to operate the QCS by performing a method. The method includes entangling a first subset of the first set of PQs with a second subset of the second set of PQs. A first set of entangled qubit-pairs is formed. The first set of entangled qubit-pairs is distributed across the first subset of PQs and the second subset of PQs. A fused LQ is formed. The fused LQ includes the first LQ and the second LQ. The fused LQ further includes a set of fused stabilizers. The set of fused stabilizers spans the first LQ and the second LQ. At least a subset of the first set of entangled qubit-pairs is employed as a set of fused-measure qubits for the set of fused stabilizers. A quantum error correction (QEC) code is implemented on the fused LQ. The QEC code employs the set of fused stabilizers.

For each of the three circuits, the first set of PQs includes a first set of data qubits for the first LQ and a first set of measure qubits for the first LQ. The first subset of PQs is a first subset of the first set of measure qubits that is located on a first LQ boundary of the first LQ. The first subset of PQs is a first set of boundary-measure qubits of the first LQ. The second set of PQs includes a second set of data qubits for the second LQ and a second set of measure qubits for the second LQ. The second subset of PQs is a second subset of the second set of measure qubits that is located on a second LQ boundary of the second LQ. The second subset of PQs is a second set of boundary-measure qubits of the second LQ.

In each of the three circuits, the QCS may further include a first set of transmission qubits that is associated with the first LQ. Each boundary-measure qubit in the first set of boundary-measure qubits is coupable to at least one transmission qubit of the first set of transmission qubits via one or more multi-qubit logic gate types. The QCS may further include a second set of transmission qubits that is associated with the second LQ. Each boundary-measure qubit in the second set of boundary-measure qubit is coupable to at least one transmission qubit of the second set of transmission qubits via the one or more multi-qubit logic gate types. the QCS may further include a set of quantum transmission lines (QTLs) that couples each transmission qubit of the first set of transmission qubits to a corresponding transmission qubit of the second set of transmission qubits. The set of QTLs is configured to transmit quantum information between the first set of transmission qubits and the second set of transmission qubits.

As noted above, the QCS may further include a first module that includes the first set of PQs and the first set of transmission qubits. The QCS may further include a second module that includes the second set of PQs and the second set of transmission qubits. The second module is physically separate from the first module. The set of QTLs quantumly couples the first module to the second module.

For each of the three circuits, entangling the first subset of PQs with the second subset of PQs comprises generating the first set of entangled qubit-pairs such that the second set of transmission qubits includes a first qubit of each entangled qubit-pair of the first set of entangled qubit-pairs and the second set of boundary-measure qubits includes a second qubit of each entangled qubit-pair of the first set of entangled qubit-pairs. When generating the first set of entangled qubit-pairs, the one or more multi-qubit logic gate types are employed to entangle the second set of boundary-measure qubits with the second set of transmission qubits. For each entangled qubit-pair of the first set of entangled qubit-pairs, a quantum state of the first qubit of the entangled qubit-pair is transmitted, via a corresponding QLT of the set of QLTs, from the second set of transmission qubits to the first set of transmission qubits. The first set of transmission qubits encodes the quantum state of the first qubit of each entangled qubit-pair of the set of entangled qubit-pairs. The second set of boundary-measure qubits encodes a quantum state of the second qubit of each entangled qubit-pair of the set of entangled qubit-pairs. Via the one or more multi-qubit logic gate types, the first set of transmission qubits is entangled with the first set of boundary-measure qubits. The first set of boundary-measure qubits encodes the quantum state of the first qubit of each entangled qubit-pair of the first set of entangled qubit-pairs, resulting in an entanglement between the first subset of PQs and the second subset of PQs. As discussed throughout, the one or more multi-qubit logic gate types may include a CNOT gate.

For each of the three circuits, generating the first set of entangled qubit-pairs comprises generating a first set of Bell pairs via the one or more multi-qubit logic gate types. The first set of entangled qubit-pairs is the first set of Bell pairs. The first qubit of each entangled qubit pair of the first set of entangled qubit-pairs is a first-half of a separate Bell pair of the first set of Bell pairs. The second qubit of each entangled qubit pair of the first set of entangled qubit-pairs is a second-half of the separate Bell pair of the first set of Bell pairs. The first-half of each Bell pair of the first set of Bell pairs is included in the second set of transmission qubits. The second-half of each Bell pair of the first set Bell pairs is included in the second set of boundary-measure qubit.

Figure 6:
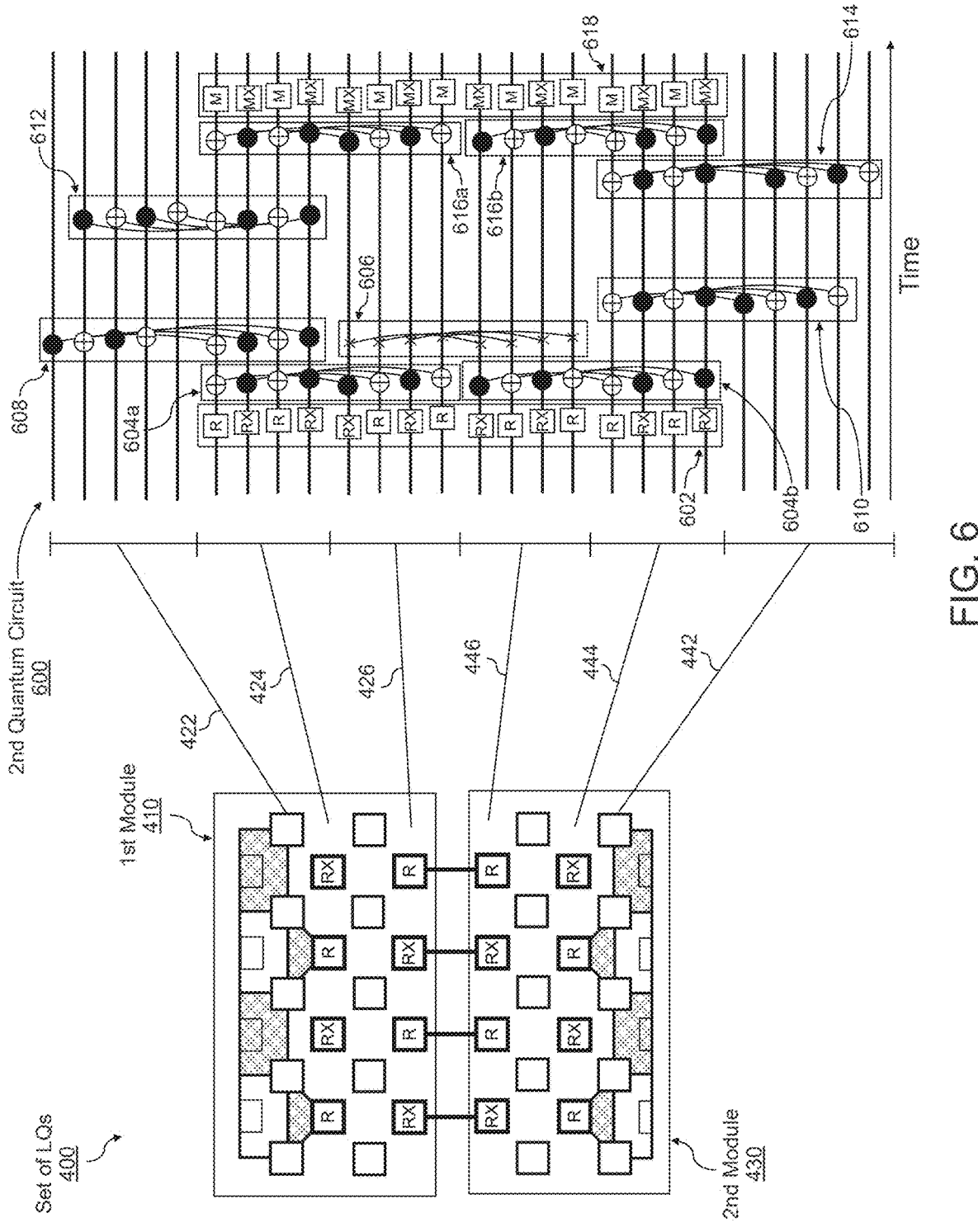
FIG. 6 shows a second quantum circuit that configures a fused logical qubit, according to various embodiments.
Figure 7:
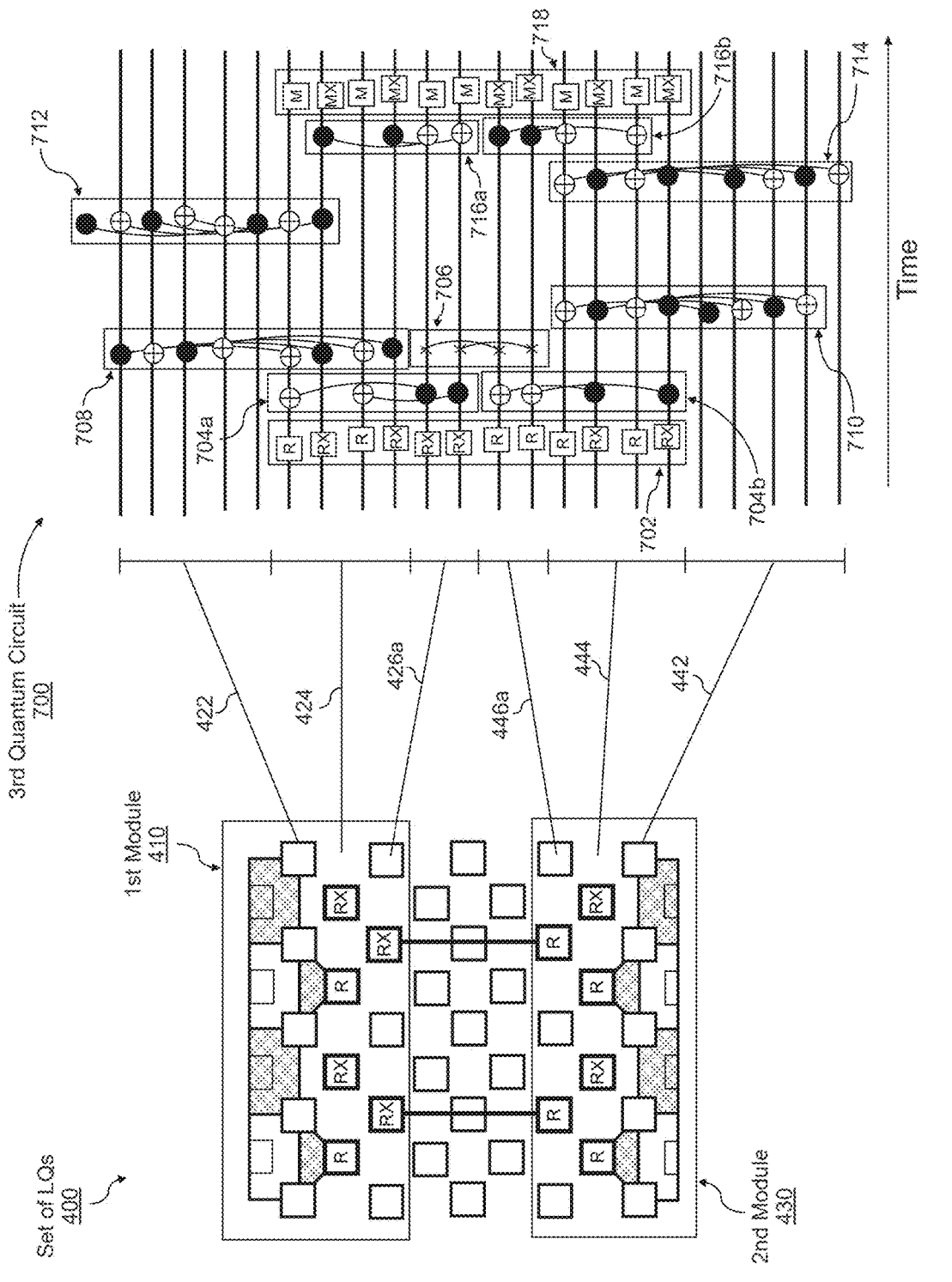
FIG. 7 shows a third quantum circuit that configures a fused logical qubit, according to various embodiments.

For the second quantum circuit 600 of FIG. 6 and the third quantum circuit 700 of FIG. 7, a second set of Bell pairs may be generated (e.g., the first set of Bell pairs being generated on the second module, while the second set of Bell pairs is generated on the first module). In such embodiments, the transmitting of the quantum information may be bi-directional. In embodiments where only a single set of Bell pairs (e.g., the first quantum circuit 500), the transmitting of the quantum information is uni-directional.

Aspects of the present disclosure provide a number of technical effects and benefits. For instance, the embodiments provide for a reduction in LQ error rates, while configuring the application of transversal multi-qubit gates across two or more LQs. Some embodiments add only minimal complexity to the surface code circuit. Other embodiments provide additional 'flag' checks, which detect errors and improve the fault-tolerance of the circuit. Still other embodiments decrease the amount of hardware required to implement the interconnect, permitting significantly increased connectivity at the logical level.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like. The superconducting qubits may be located in a cryostat to cool the qubits to superconducting temperatures (e.g., less than about 3 Kelvin). However, aspects of the present disclosure are not limited to superconducting qubits. In some examples, any suitable qubit structure may be used without deviating from the scope of the present disclosure, such as photonic qubits, trapped ion qubits, spin qubits, neutral atom qubits, quantum dot qubits, molecular qubits, or other qubits.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots, or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit, and the control device(s) 112 and readout devices(s) 114 may implement one or more quantum logic gates that operate on the quantum hardware 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameters 106 from the classical processors 104. The quantum hardware 102 may use the received physical control qubit parameters 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system 110, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the quantum system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Fusing Logical Qubits to Implement Transversal Multi-Qubit Gates

In order to implement multi-qubit logic operations across multiple logical qubits, the embodiments are directed to systems, methods, architectures, and hardware configurations for fusing two or more logical qubits. A fused logical qubit that includes two or more logical qubits (e.g., a first logical qubit and a second logical qubit) may be formed by fusing (e.g., stitching, sewing, or otherwise combining) the two or more logical qubits. The two or more logical qubits may be fused along a boundary of each of the logical qubits. For instance, a fused logical qubit may be formed by fusing the first logical qubit to the second logical qubit, e.g., a first boundary of the first logical qubit may be fused to a second boundary of the second logical qubit. The fusion of the first logical qubit to the second logical qubit forms a seam between the two logical qubits, wherein the seam is formed on the first boundary (of the first logical qubit) and the second boundary (of the second logical qubit). Upon the formation of the fused logical qubit, a transversal logic gate (e.g., a CNOT operation) may be applied across the first logical qubit and the second logical qubit.

Prior to fusion, a quantum error correction (QEC) code may be implemented on each of the first logical qubit and the second logical qubit. Each of the first logical qubit and the second logical qubit has their own set of stabilizers within the QEC code. Upon fusion, a set of "fused" stabilizers is formed for the fused logical qubit. The set of fused stabilizers are common to the first boundary of the first logical qubit and the second boundary of the second logical qubit. Furthermore, the set of fused stabilizers span across the seam between the first LQ and the second LQ are common to the first boundary of the first logical qubit and the second boundary of the second logical qubit. Thus, the QEC may be implemented on the whole of the fused logical qubit. Once fused with a sufficient QEC code spanning the fused logical qubit, the transversal gate may be applied across the first logical qubit and the second logical qubit, while keeping the interactions of the physical qubits "local." Having local qubit-qubit interactions further decreases the logical error rate. After the application of the transversal gate, the fusion of the two logical qubits may be dissolved, such that the fused logical qubit is dissolved (including the set of fused stabilizers), and the first and second logical qubits are kept operating via the QEC code.

Figure 2A:
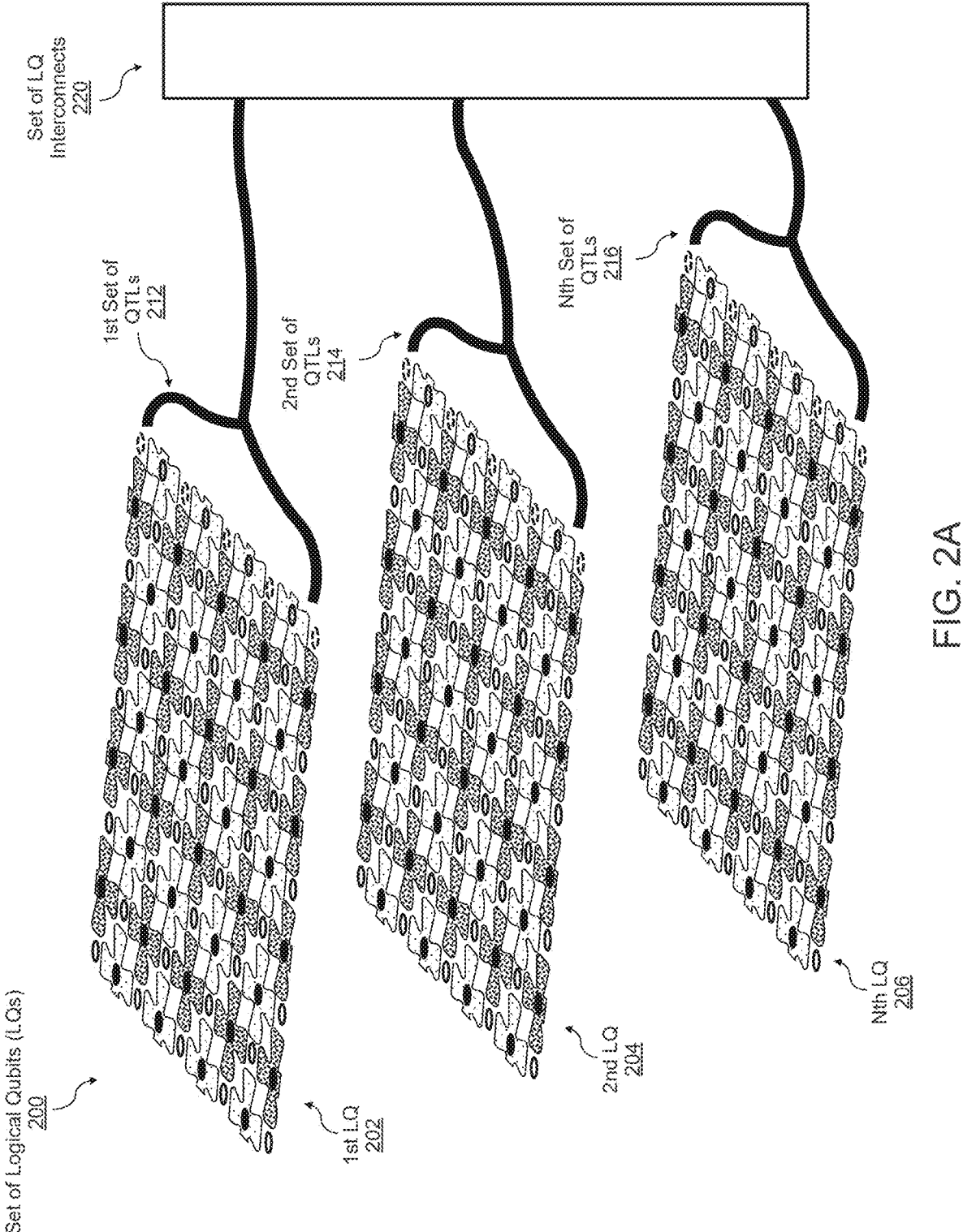
FIG. 2A illustrates a set of logical qubits that may be fused, according to various embodiments.

FIG. 2A illustrates a set of logical qubits that may be fused, according to the various embodiments. More particularly, FIG. 2A shows a set of logical qubits (LQs) 200. The set of LQs 200 includes N qubits, where N is an integer and N≥2. For instance, the set of LQs 200 includes a first LQ 202, a second LQ 204, and an Nth LQ 206. As discussed below, each LQ in the set of LQs is formed by redundant physical qubits (e.g., both data measure qubits) that, via an implementation of a quantum error correction (QEC) code (e.g., a topological surface code) encode a single qubit of information.

As noted above, each of the LQs in the set of LQs 200 is implemented via a QEC code. For instance, the QEC code may be a topological surface code. The embodiments are not limited to surface codes, and other embodiments may employ other QEC codes (e.g., color codes or the like). As such, each LQ has their own set of stabilizers. Implementing the QEC code configures a quantum computing system (QCS) for fault-tolerant quantum computing. Each LQ may include a set of (physical) data qubits (e.g., the open circles) and a set of (physical) measure (or ancilla) qubits (e.g., the closed circles). Each logical qubit is comprised of at least a first set of stabilizers and a second set of stabilizers. The first set of stabilizers may include stabilizers of a first stabilizer type (e.g., Z-type stabilizers) and the second set of stabilizers may include stabilizers of a second stabilizer type (e.g., X-type stabilizers). Stabilizers of the second type may be configured to detect errors of a first error type (e.g., Z-errors) and stabilizers of the first type may be configured to detect errors of a second error type (e.g., X-errors), where X-errors and Z-errors, as well as Y-errors are Pauli-noise errors. For instance, Z-type stabilizers are configured to detect X-type errors and X-type stabilizers are configured to detect Z-type errors.

Other embodiments may vary in the error types. For example, some embodiments that consider Pauli-noise channels may employ Y-type stabilizers, rather than X-type or Z-type stabilizers. In the embodiments discussed in reference to FIGS. 2A-2B, darkly-shaded "cross configurations" indicate Z-type stabilizers (e.g., for detecting X-type errors) and lightly-shaded "cross-configurations" indicate X-type stabilizers (e.g., for detecting Z-type errors). A Y-type error may be detected via a combination of Z-stabilizers and X-stabilizers. However, the embodiments may vary in error models and stabilizer choices.

In some embodiments, each LQ in the set of LQs 200 is implemented on a physically separate die or chip, such as but not limited to a separate quantum processor chip.

Throughout the disclosure, a chip that implements a LQ may be referred to as a module. Thus, the first LQ 202 may be implemented on a first module, the second LQ 204 may be implemented on a second module that is physically separate from the first module, and the Nth LQ 206 may be implemented on an Nth module that is physically separate from the first module, the second module, and any other module that implements other LQs that are included in the set of LQs 200. Thus, a QCS may include at least N modules (or separate chips with integrated physical qubits). Each of the modules may be included in a quantum computing system (QCS). Note that in some embodiments two or more of the LQs may be located on a common chip or die (i.e., a common module).

Quantum computing may require the implementation of multi-qubit (e.g., CNOT) quantum logic gates (e.g., a CNOT gate). Such multi-qubit gates may be employed to entangle and disentangle qubits. For instance, to entangle a first physical qubit and a second physical qubit (which are not already entangled), a CNOT gate may operate on the first physical qubit and a second physical qubit. Because a CNOT gate is its own inverse, another application of the CNOT gate to the entangled first and second physical qubits may disentangle the pair. To perform a multi-qubit logic operation on multiple LQs (e.g., the first LQ 202 and the second LQ 204), the notion of a transversal logic gate (e.g., a logic gate implemented across the multiple LQs) may be invoked.

In many QCSs, qubit-qubit interactions (via a multi-qubit logic gate) may be subject to a locality constraint. That is, interactions (or coupling) between physical qubits may be constrained such that only "neighboring" qubits are enabled to interact with one another. The "size" of a neighborhood is dependent on the characteristics of the QCS. Increasing the size of a neighborhood of interacting qubits may result in additional qubit errors, noise, and/or qubit decoherence. As such, in some embodiments, within a single module (or chip), the size of the neighborhood for interacting qubits is kept relatively small. For instance, in at least one embodiment, the locality of qubit interactions is such that only "nearest neighbors" of qubits may interact with one another. As shown in FIG. 2A, in some embodiments, the physical qubits are arranged in a 2D grid. In such 2D grids, with nearest-neighbor locality for qubit-qubit interactions, each qubit (except for those located on the edge or boundary of a chip) may interact with four "nearest neighboring" other qubits. Qubits on the boundary of the module may interact with a lesser number of qubits. As such, physical qubits may be characterized as "bulk" qubits that have four nearest neighbors, while "boundary" or "edge" qubits have less than four nearest neighbors.

As noted above, in order to implement a transversal gate across two or more LQs, the embodiments may connect (e.g., fuse or join) two or more LQs. Fusing two (or more) LQs may result in a fused LQ that is comprised of the two (or more) LQs that were fused in its formation. Thus, a fused LQ is an LQ where the QEC may be implemented to detect and correct qubit errors occurring in the physical qubits of the fused LQ. Throughout this disclosure, fusing two (or more) LQs may be alternatively referred to as connecting, joining, stitching, and/or sewing the two LQs together to form a fused LQ.

To connect two (or more) LQs, the two (or more) LQs may be coupled via a set of quantum transmission lines (QTLs). A QTL coupling two physical qubits configures the transmission of quantum information (e.g., a quantum state) from one of the physical qubits to the other physical qubit. In at least one embodiment, a QTL configures the bi-directional swap of quantum states between the two physical qubits, while in other embodiments, a transmission of a quantum state may be uni-directional. As shown in FIG. 2A, the first LQ 202 includes a first set of QTLs 212, the second LQ 204 includes a second set of QTLs 214, and the Nth LQ 206 includes an Nth set of QTLs 216. Each QTL of a set of QTL is configured to transmit quantum information (e.g., a quantum state of one or more physical qubits). In some embodiments, each QTL in a set of QTLs may be configured to transmit quantum information to and from a physical qubit on a boundary of the corresponding LQ. A set of LQ interconnects 220 may be included to interconnect the sets of QTLs between two or more corresponding LQ.

Figure 2B:
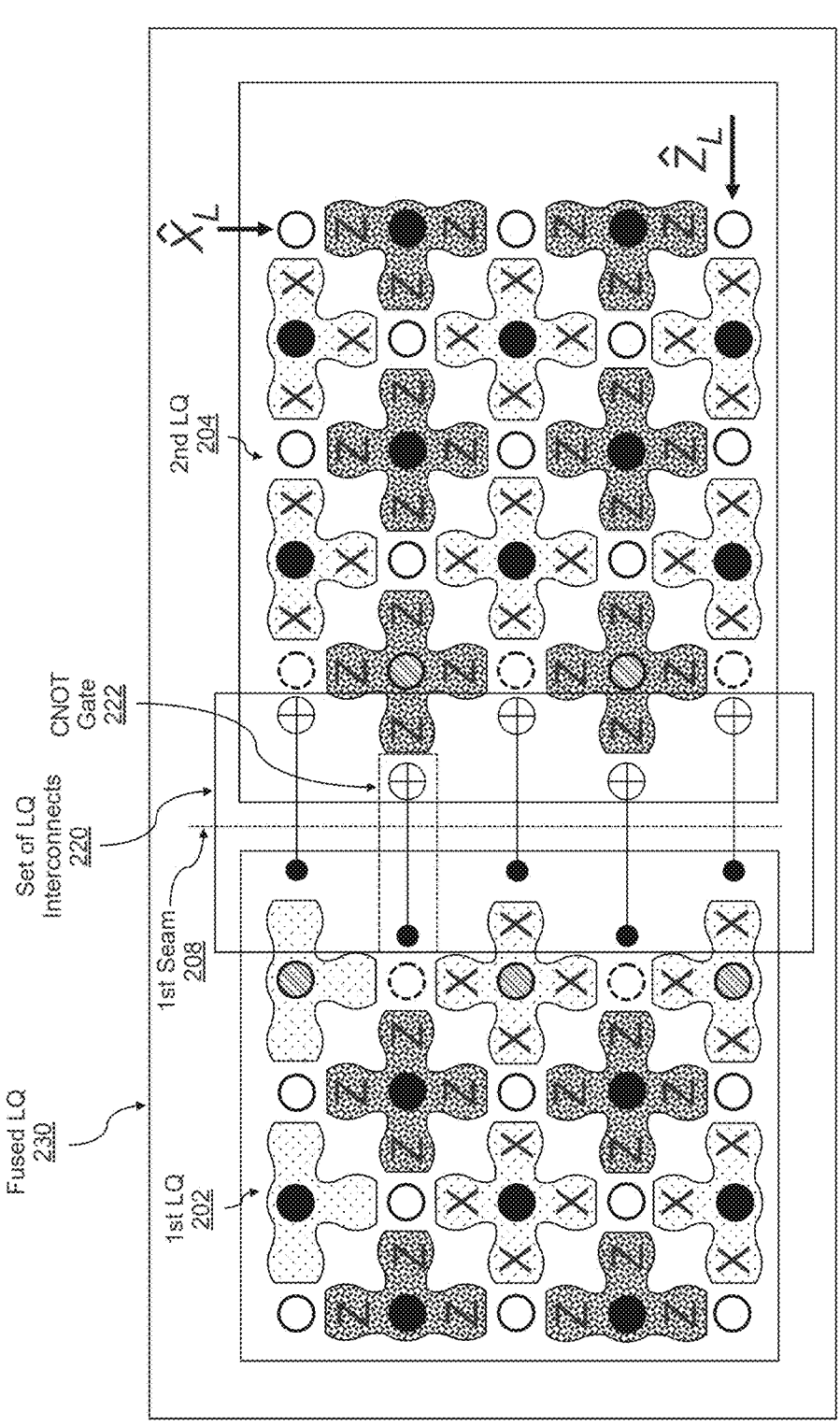
FIG. 2B shows a non-limiting example of a fused logical qubit, according to various embodiments.

As mentioned above, two or more LQs may be interconnected and "fused" to form a "fused LQ." A fused LQ may be an LQ that is comprised of two or more smaller LQs. The QEC code may be implemented on a fused LQ as if it is a single LQ. FIG. 2B shows a non-limiting example of a fused logical qubit, according to various embodiments. More specifically, FIG. 2B illustrates fused LQ 230 that includes the first LQ 202 of FIG. 2A and the second LQ 204 of FIG. 2A.

In FIG. 2B, the first LQ 202 and the second LQ 204 of FIG. 2A are fused (e.g., sewn or stitched together) along a LQ seam 208 via the set of LQ interconnects 220. As shown in FIG. 2B, the set of LQ interconnects 220 includes a set of CNOT gates. The set of CNOT gates may be employed to entangle the physical qubits along the boundaries of the first LQ 202 and the second LQ 204, where the boundaries correspond to the LQ seam 208. For instance, a CNOT gate may be applied to two physical qubits to form a maximally entangled qubit pair (e.g., a Bell pair). Once entangled, the two physical qubits may be treated as a single quantum object (e.g., an object described by a four-dimensional wave function). As described below, after the first LQ 202 is fused with (or sewn together with) the second LQ 204, the resulting fused LQ 230 may be treated as a larger LQ, where a modified QEC code may be implemented across the entire fused LQ. The transversal logic gates may be applied between the first LQ 202 and the second LQ 204. After the application of the transversal gate, the fused LQ 230 may be separated (e.g., the fused LQ may be dissolved) to result in the re-formation of the separate first LQ 202 and the separate second LQ 204.

Note that prior to generating the fused LQ 230, separate surface codes may be implemented on the first LQ 202 and the second LQ 204, which provide "local" checks for errors in the separate LQs. Upon the formation of the fused LQ 230, a "global" surface code may be implemented on the fused LQ 230, which provides for error checks across the fused LQ 230. For instance, multi-qubit gates (e.g., the CNOT gates shown in FIG. 2B) configure error checks between the first LQ 202 and the second LQ 204. Upon the formation of the fused LQ 230, lattice surgery may be performed on the fused LQ 230 (e.g., an application of one or more transversal gates across the first LQ 202 and the second LQ 204).

Figure 3A:
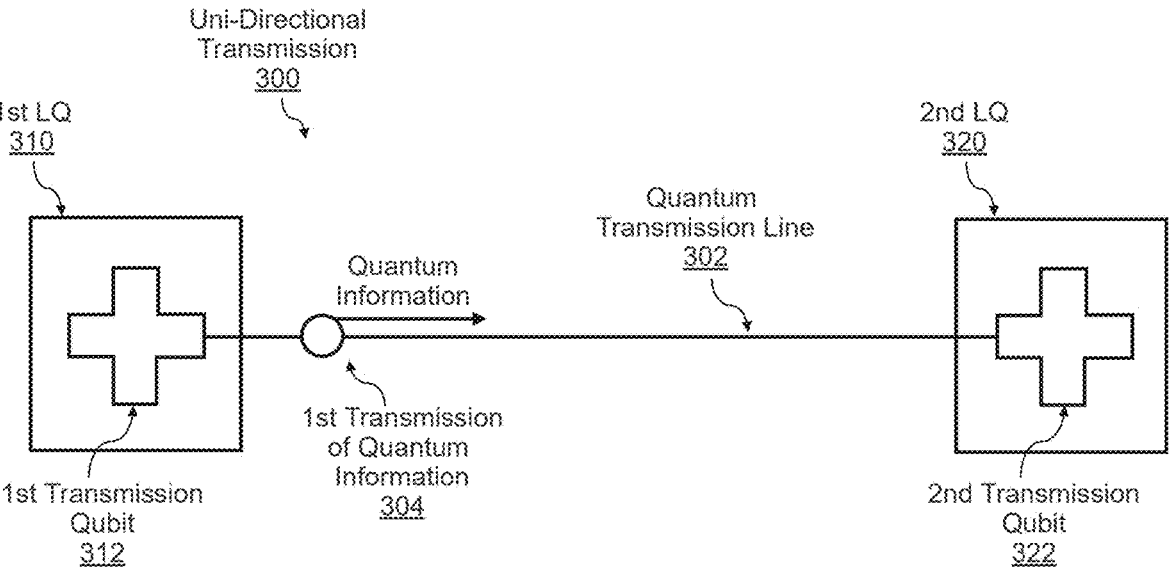
FIG. 3A shows a uni-directional transmission of quantum information along a quantum transmission line, according to various embodiments.

In some embodiments, the transmission of a quantum state along a QTL is uni-directional, where a transmitting qubit (e.g., a first (physical) transmission qubit) sends its quantum state to a receiving qubit (e.g., a second (physical) transmission qubit). In other embodiments, the two (physical) transmission qubits may "swap" their respective quantum states in a bi-directional transmission of quantum states, e.g., a quantum swap operation. FIG. 3A shows a uni-directional transmission 300 of quantum information along a quantum transmission line, according to various embodiments. More specifically, FIG. 3A shows a first LQ 310 and a second LQ 320. The first LQ 310 includes (or is otherwise associated with) a first transmission qubit 310. The second LQ 320 includes (or is otherwise associated with) a second transmission qubit 320. Transmission qubits are discussed below, but briefly, transmission qubits are physical qubits that are employed to transmit (e.g., send and/or receive) quantum information (e.g., quantum states). In some embodiments, a LQ may include (or at least be associated with) a set of transmission qubits. For instance, the first LQ 310 and the first transmission qubit 312 may be located on a first chip (e.g., a first module) and the second LQ 320 and the second transmission qubit 322 may be located on a second chip (e.g., a second module) that is physically separated from the first chip. A quantum transmission line (QTL) 302 may quantum-informationally couple the first transmission qubit 312 to the second transmission qubit 322.

In FIG. 3A, a uni-directional transmission 300 may include the sending of quantum information from the first transmission qubit 312 to the second transmission qubit 322 (e.g., the first transmission of quantum information 304). In at least one embodiment, the quantum information sent from the first transmission qubit 312 to the second transmission qubit 322 (via the QTL 302) may include the quantum state of the first transmission qubit 312. Once sent from the first transmission qubit 312 and received by the second transmission qubit 322, the second transmission qubit 322 may encode the quantum state of the first transmission qubit 312, while the encoding of the quantum state in the first qubit 312 may be destroyed.

Note that a uni-directional transmission 300 of quantum information along a quantum transmission line 302, according to various embodiments. More particularly, FIG. 3A shows a first transmission qubit 312 and a second transmission qubit 322 coupled via a quantum transmission line (QTL) 302.

Figure 3B:
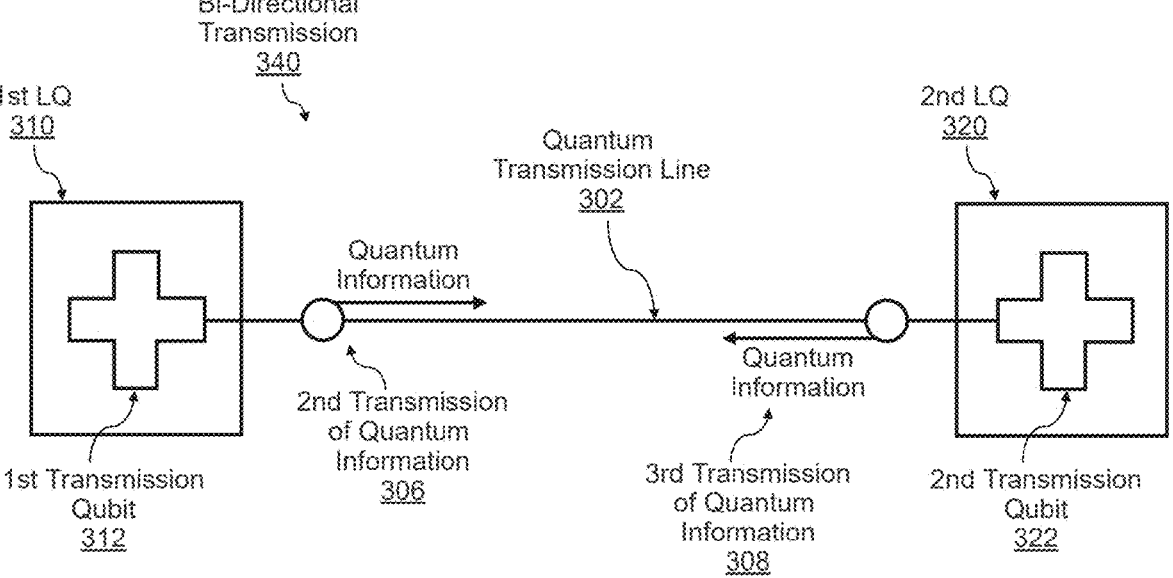
FIG. 3B shows a bi-directional transmission of quantum information along a quantum transmission line, according to various embodiments.

FIG. 3B shows a bi-directional transmission 340 of quantum information along a quantum transmission line, according to various embodiments. FIG. 3B includes the first LQ 310, the second LQ 320, the first transmission qubit 312, the second transmission qubit 322, and the QTL 302 of FIG. 3A. The bi-directional transmission 340 of quantum information includes a second transmission of quantum information 306 and a third transmission of quantum information 308. The second transmission of quantum information 306 and the third transmission of quantum information 308 may be a "quantum swap operation." In the second transmission of quantum information 306, the quantum state of the first transmission qubit 312 is sent from the first transmission qubit 312, transmitted along the QTL 302, and received by the second transmission qubit 322. Likewise, in the third transmission of quantum information 308, the quantum state of the second transmission qubit 322 is sent from the second transmission qubit 322, transmitted along the QTL 302, and received by the first transmission qubit 312.

After the quantum swap operation, the first transmission qubit 312 encodes the initial quantum state of the second transmission qubit 322 and the second transmission qubit 322 encodes the initial quantum state of the first transmission qubit 312. For instance, initially, the first transmission qubit 312 may encode a first quantum state and the second transmission qubit 322 may encode a second quantum state. After the bi-directional transmission 340 of quantum information (e.g., a quantum swap operation), the first transmission qubit 312 encodes the second quantum state and the second transmission qubit 322 encodes the first quantum state.

Figure 4A:
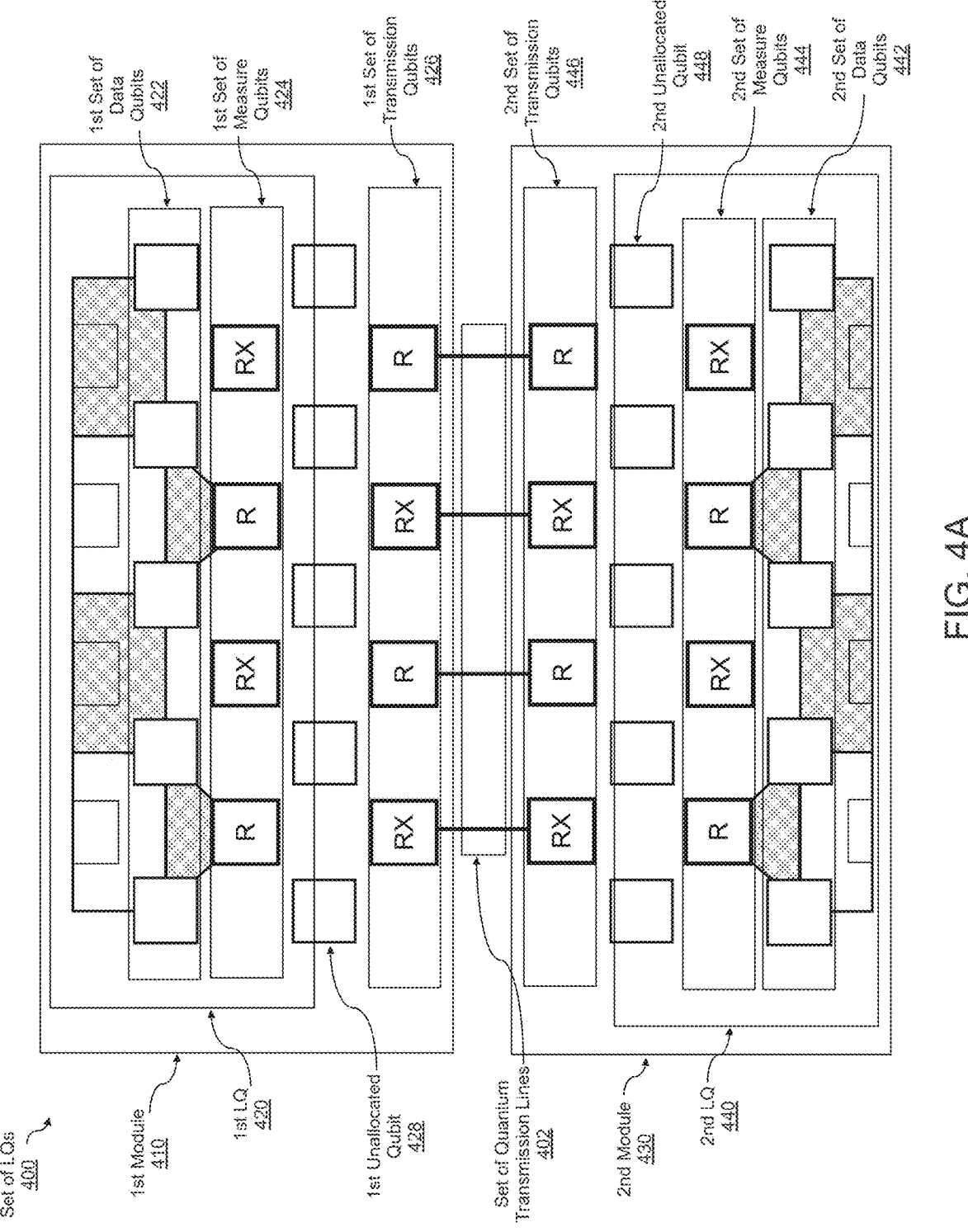
FIG. 4A shows a set of logical qubits, according to various embodiments.

FIG. 4A shows a set of logical qubits 400, according to various embodiments. More particularly, the set of logical qubits (LQs) 400 includes a first LQ 420 and a second LQ 440. The first LQ 420 is implemented on a first module 410 (e.g., a first chip) and a second module 430 (e.g., a second chip) that is physically separate from the first module 410. In some embodiments, the first LQ 420 may be similar to first LQ 202 of FIGS. 2A-2B and second LQ 440 may be similar to second LQ 204 of FIGS. 2A-2B. Note the distance of the surface codes of FIGS. 2A-2B and FIG. 4A may differ.

In FIG. 4A, only a region near a first boundary of the first LQ 420 is shown. Likewise, only a region near a second boundary of the second LQ 440 is shown. A d=5 surface code forms each of the first LQ 420 and the second LQ 440. In the architecture of a surface code, an LQ is comprised of stabilizers of two primary types. In FIG. 4A, the "smaller" squares represent physical qubits and the "larger" squares, as well as the "semicircle" regions represent stabilizers. The darker shaded larger squares and semicircles correspond to a first stabilizer type (e.g., a Z-type stabilizer) and the lighter shaded larger squares and semicircles correspond to a second stabilizer type (e.g., a X-type stabilizer). As a reminder, the first stabilizer type is configured to detect a second error type (e.g., X-errors), while the second stabilizer type is configured to detect a first error typer (e.g., Z-errors). As another reminder, LQs have (physical) data qubits and (physical) measure qubits. Also, stabilizers come in two flavors: "bulk" stabilizers and "boundary" (or "edge") stabilizers. Bulk stabilizers are weight-4 stabilizers and are represented by the larger squares in FIG. 4A. Bulk stabilizers have four (physical) data qubits located at the corners of a larger square and a (physical) measure qubit located at the center of the square. Weight-4 stabilizers are associated with an operator comprised of four operators: one for each of the data qubits (e.g., ZZZZ (for Z-type stabilizers) and XXXX (for X-type stabilizers)). Note however, that given the limited explicitly shown regions in FIG. 4A, FIG. 4A does not show a complete bulk stabilizer. A boundary (or edge) stabilizer is represented by a semicircle and has two data qubits located at antipodal points on the semicircle and a single measure qubit located on the semicircle and between the data qubits. Such boundary stabilizers are weight-2 stabilizers and comprise of two operators: one for each of the data qubits (e.g., ZZ (for Z-type stabilizers) and XX (for X-type stabilizers)).

More particularly, the first LQ 420 has a first set of (physical) data qubits 422. Note that FIG. 4A does not show all the data qubits of the first LQ 420. Likewise, the second LQ 440 has a second set of (physical) data qubits 442. FIG. 4A does not show all the data qubits of the second LQ 440. The first set of data qubits 422 are located on a first boundary (or edge) of the first LQ 420 and the second set of data qubits 442 are located on a second boundary (or edge) of the second LQ 440. Thus, the physical qubits of the first set of data qubits 422 and the second set of data qubits 442 may be referred to as boundary-data qubits. When forming a fused LQ by fusing the first LQ 420 with the second LQ 440, the first boundary (or edge) of the first LQ is fused with (or sewn or stitched together with) the second boundary (or edge) of the second LQ 440.

The first LQ 420 also has a first set of (physical) measure qubits 424. Note that other measure qubits of the first LQ 420 are shown in FIG. 4A, but FIG. 4A does not show all the measure qubits of the first LQ 420. The second LQ 440 has a second set of (physical) measure qubits 444. Note that other measure qubits of the second LQ 440 are shown in FIG. 4A, but FIG. 4A does not show all the measure qubits of the second LQ 440. The first set of measure qubits 424 is located on the first boundary of the first LQ 420 and a subset of the first set of measure qubits are included in the boundary stabilizers of the first boundary of the first LQ 420 (e.g., the first stabilizer type). Similarly, the second set of measure qubits 444 is located on the second boundary of the second LQ 440 and a subset of the second set of measure qubits is included in the boundary stabilizers of the second boundary of the second LQ 440 (e.g., the first stabilizer type). The physical qubits of the first set of measure qubits 424 and the second set of measure qubits 444 may be referred to as boundary-measure qubits. Note that a measure qubit included in a first stabilizer type (e.g., a Z-type stabilizer) may be a first type measure qubit (e.g., a Z-type measure qubit) and a measure qubit includes in a second stabilizer type (e.g., a X-type stabilizer) that may be a second type measure qubit (e.g., a X-type measure qubit).

Note that each measure qubit of the first set of measure qubits 242 and each measure qubit of the second set of measure qubits 444 is labeled with a "R" or a "RX." When a qubit is labeled with "R," the "R" indicates is a single-qubit logic operation that resets the qubit in the |0> (in the Z-basis notation). The Z-basis may be referred to as the computational-basis. When a qubit is labeled with "RX," the "RX" indicates a single-qubit logic operation that resets the qubit in the |+> (in the X-basis notation). Note that measure qubits included in a Z-basis stabilizer are reset with an "R" reset operation. An "R" reset operation may be referred to as a Z-basis reset. Measure qubits included in a X-basis stabilizer are reset with an "RX" reset operation. An "RX" reset operation may be referred to as a Z-basis reset. These reset operations are discussed further in conjunction with at least FIG. 5.

The first module 410 includes a first set of (physical) transmission qubits 426 and the second module 430 includes a second set of (physical) transmission qubits 446. Thus, the first LQ 420 is associated with the first set of transmission qubits 426 and the second LQ 440 is associated with the second set of transmission qubits 446. Each module may include additional (physical) qubits that are unallocated. For instance, the first module 410 includes a first unallocated qubit 428 and the second module 430 includes a second unallocated qubit 448. Note that FIG. 4A shows other unallocated qubits on each of the first module 410 and the second module 430. Note that the transmission qubits of both the first set of transmission qubits 426 and the transmission qubits of the second set of transmission qubits 446 are labeled with Z-basis and X-basis qubit reset operations.

The "locality" of the qubit-qubit interactions configure the qubits such that the data qubits of the first set of data qubits 422 may interact with "nearest neighbor" measure qubits of the first set of measure qubits 424 along the two "diagonal" axes of the plane of FIG. 4A. Likewise, the data qubits of the second set of data qubits 442 are configured to interact with "nearest neighbor" measure qubits of the second set of measure qubits 444 along the two "diagonal" axes. For instance, the measure and data qubits may interact via a multi-qubit logic gate (e.g., a CNOT gate).

The locality of the qubit-qubit interactions configure the qubits such that a measure qubit of the first set of measure qubits 424 may interact with a "nearest neighbor" transmission qubit of the first set of transmission qubits 426, along the "vertical" axis of the plane of FIG. 4A. Likewise, a measure qubit of the second set of measure qubits 444 may interact with a "nearest neighbor" transmission qubit of the second set of transmission qubits 446, along the "vertical" axis. As noted above, in addition to interacting with the corresponding transmission qubits, the boundary measure qubits may interact with the data qubits included in the corresponding stabilizer.

A set of quantum transmission lines (QTLs) 402 may couple the first set of transmission qubits 426 to the second set of transmission qubits 446. Note that there may be a one-to-one correspondence between the transmission qubits of the first set of transmission qubits 424 and the transmission qubits of the second set of transmission qubits 446. In such embodiments, there may also be a one-to-one correspondence between the QTLs of the set of QTLs and the transmission qubits of the two sets of transmission qubits. As such, each QTL of the set of QTLs 402 may couple a pair of transmission qubits across the first set of transmission qubits 426 and the second set of transmission qubits 446. Quantum information may be transmitted between the pair of coupled transmission qubits over the corresponding QTL, as discussed in conjunction with at least FIGS. 3A-3B. The transmission of quantum information may be uni-directional or bi-directional as described in FIGS. 3A-3B.

Figure 4B:
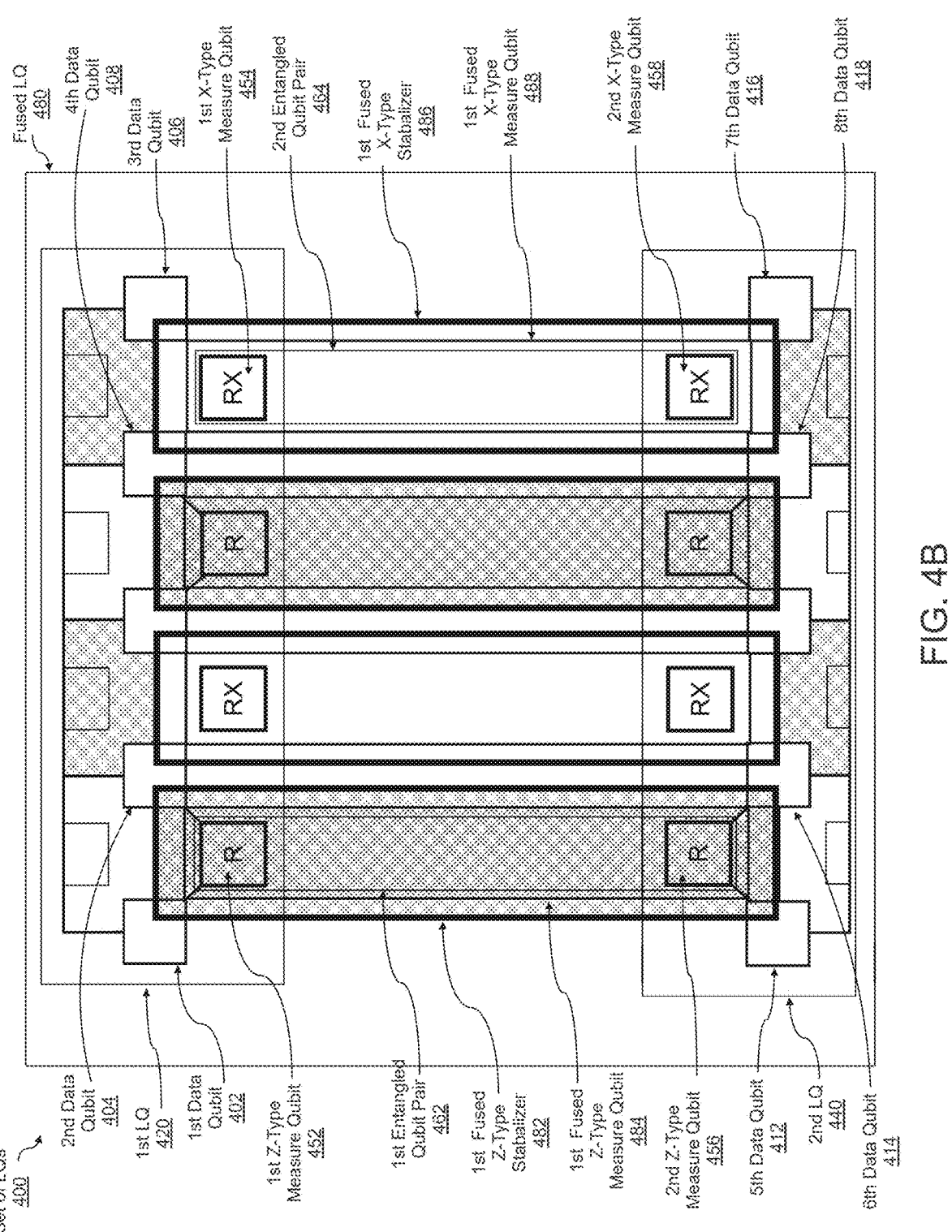
FIG. 4B shows a fused logical qubit comprised of the first logical qubit and the second logical qubit of FIG. 4A, according to various embodiments.

As noted above, to form a fused LQ, the first LQ 420 and the second LQ 440 may be fused along the first boundary of the first LQ 420 and the second boundary of the second LQ 440. FIG. 4B shows a fused logical qubit comprised of the first logical qubit 420 and the second logical qubit 440 of FIG. 4A, according to various embodiments. More particularly, similar to FIG. 4A, FIG. 4B shows the set of LQs 400 which includes the first LQ 420 of FIG. 4A and the second LQ 440 of FIG. 4A. The first LQ 420 and the second LQ 440 are fused along the first boundary of the first LQ 420 and the second boundary of the second LQ 440 to form a fused LQ 480. In FIG. 4B, a first data qubit 402, a second data qubit 404, a third data qubit 406, and a fourth data qubit 408, of the first set of data qubits 422 of FIG. 4A, are explicitly labeled. Likewise, a fifth data qubit 412, a sixth data qubit 414, a seventh data qubit 416, and an eighth data qubit 418, of the second set of data qubits 442 of FIG. 4B, are explicitly labeled. Also, in FIG. 4B, a first Z-type measure qubit 452 and a first X-type measure qubit 454 of the first set of measure qubits 424 of FIG. 4A. are explicitly labeled. Likewise, a second Z-type measure qubit 456 and a second X-type measure qubit 458 of the second set of measure qubits 444 of FIG. 4A are explicitly labeled. Note that the Z-type measure qubits (e.g., measure qubits included in a Z-type stabilizer) are labeled with "R" reset operations and X-type measure qubits (e.g., measure qubits included in an X-type stabilizer) are labeled with "RX" reset operations. Note that the transmission qubits, the unallocated qubits, and the set of QTLs 402 of FIG. 4A are not explicitly shown in FIG. 4B. Also note that in FIG. 4B, for purposes of clarity, the unallocated qubits (e.g., the first unallocated qubit 428 and the second unallocated qubit 448 of FIG. 4A), the transmission qubits (e.g., the first set of transmission qubits 426 and the second set of transmission qubits 446 of FIG. 4A), and the QTLs (e.g., the set of QTLS 402 of FIG. 4A) have been omitted in FIG. 4B.

Figure 5:
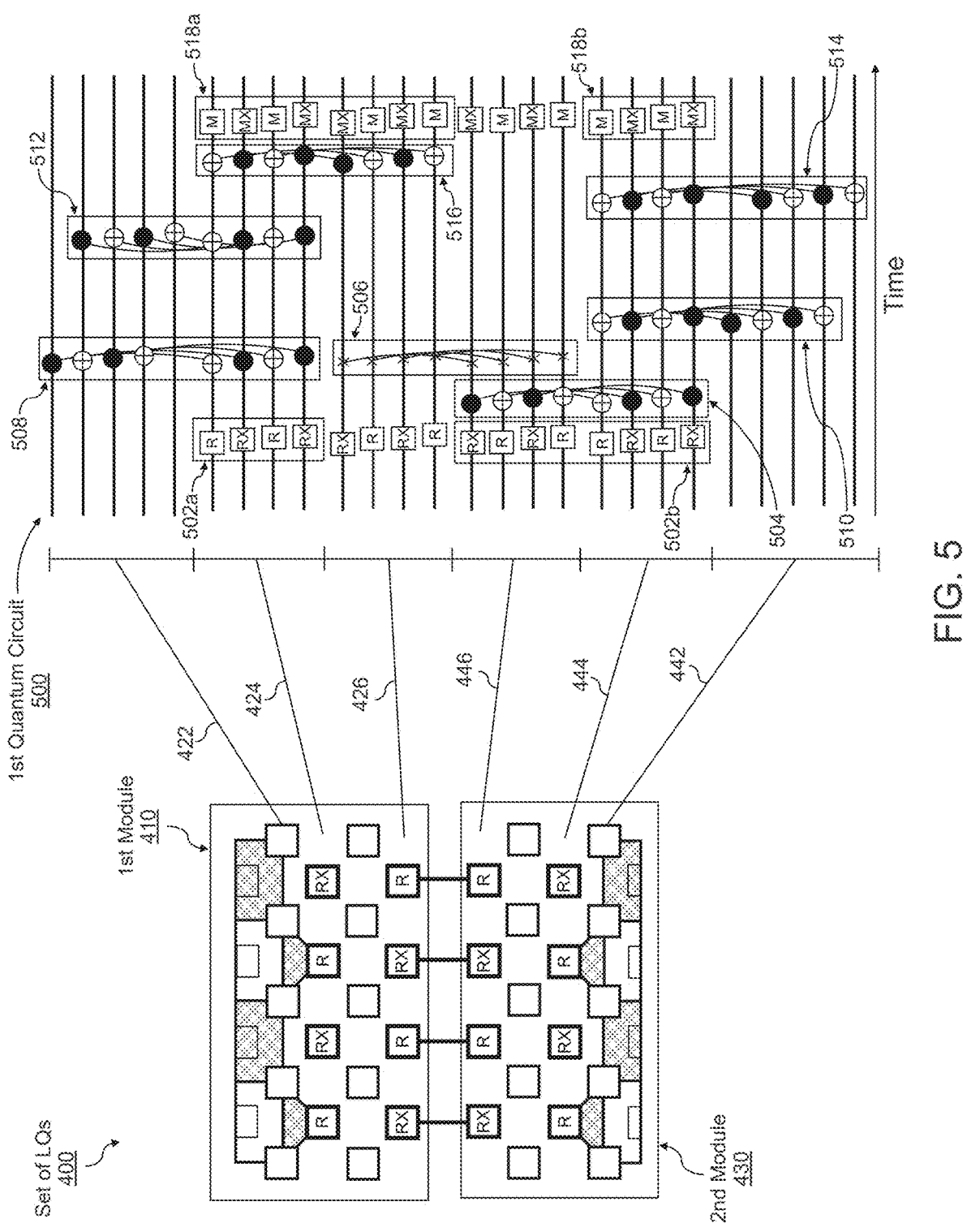
FIG. 5 shows a first quantum circuit that configures a fused logical qubit, according to various embodiments.

However, FIG. 4B does show the first LQ 420 and the second LQ 440. The first LQ 420 includes a first set of physical qubits (e.g., the first set of data qubits 422 and the first set of measure qubits 424). The second LQ 440 includes a second set of physical qubits (PQs) (e.g., the second set of data qubits 442 and the second set of measure qubits 444). The various embodiments may be employed to fuse the first LQ 420 and the second LQ 440 to form a fused LQ 480 that includes the first LQ 420 and the second LQ 440. Three non-limiting quantum circuits are shown in FIGS. 5-7 that may be employed to form a fused LQ, such as but not limited to fused LQ 480. In some embodiments, to form the fused LQ 480, each measure qubit of the first set of measure qubits 424 is entangled with a corresponding measure qubit of the second set of measure qubits 444. For instance, in FIG. 4B, the first Z-type measure qubit 452 of the first set of measure qubits 424 is entangled with the second Z-type measure qubit 456 of the second set of measure qubits 444 to form a first entangled qubit pair 462. Likewise, the first X-type measure qubit 454 of the first set of measure qubits 424 is entangled with the second X-type measure qubit 458 of the second set of measure qubits 444 to form a second entangled qubit pair 464. Entangling the two sets of (boundary) measure qubits across the two LQs forms a first set of entangled qubit-pairs.

As noted above, three alternative quantum circuit embodiments for forming the first set of entangled qubit-pairs are shown in FIGS. 5-7. In some embodiments, the entangled qubit-pairs are maximally entangled. For instance, each entangled qubit pair may be a Bell state. Once in a maximally estranged state, the entangled qubit pair may be treated as a single quantum state (e.g., described by a Bell state wave function). Thus, at least one of the qubits in an entangled qubit pair may serve as a measurement qubit for weight-4 stabilizer that spans across the first LQ 420 and the second LQ 440. For instance, the first entangled qubit pair 462 may be employed to form a first "fused" Z-type measure qubit 484. Likewise, the second entangled qubit pair 464 may be employed to form a first "fused" X-type measure qubit 488. As shown in FIG. 4B, when entangling the measure qubits, like-types are entangled (e.g., Z-type (boundary) measure qubits of the first LQ 420 are entangled with Z-type (boundary) measure qubits of the second LQ 440 and X-type (boundary) measure qubits of the first LQ 420 are entangled with X-type (boundary) measure qubits of the second LQ 440). Thus, a set of "fused" weight-4 stabilizers may be formed that span the first LQ 420 and the second LQ 440.

For instance, a first fused Z-type stabilizer 482 may be formed that spans the first LQ 420 and the second LQ 440. The first fused Z-type stabilizer 482 includes the first data qubit 402 and the second data qubit 404 of the first LQ 420, as well as the fifth data qubit 412 and the sixth data qubit 414 of the second LQ 440. The first fused Z-type stabilizer 482 also includes at least one of the measure qubits of the first entangled qubit pair 462 (e.g., at least one of the first Z-type measure qubit 452 of the first LQ 420 and the second Z-type measure qubit 412 of the second LQ 440). That is, the first fused Z-type stabilizer 482 includes the first fused Z-type measure qubit 484. Likewise, a first fused X-type stabilizer 486 may be formed that spans the first LQ 420 and the second LQ 440. The first fused X-type stabilizer 486 includes the third data qubit 406 and the fourth data qubit 408 of the first LQ 420, as well as the seventh data qubit 416 and the eight data qubit 418 of the second LQ 440. The first fused X-type stabilizer 486 also includes at least one of the measure qubits of the second entangled qubit pair 464 (e.g., at least one of the first X-type measure qubit 454 of the first LQ 420 and the second X-type measure qubit 458 of the second LQ 440). That is, the first fused X-type stabilizer 486 includes the first fused X-type measure qubit 488. Having weight-4 stabilizers spanning the two LQs enables a QEC code to be implemented across the two LQs, thus fusing the two LQs into a single fused LQ (e.g., fused LQ 480).

Before turning attention to the details of various quantum circuits that enable the forming of a fused LQ, the embodiments may include a method for operating a fault-tolerant quantum computing system (QCS). The QCS includes a first set of physical qubits (PQs) that forms a first logical qubit (LQ) (e.g., the first LQ 420) and a second set of PQs that forms a second LQ (e.g., the second LQ 440). The method includes entangling a first subset of the first set of PQs (e.g., the first set of measure qubits 424) with a second subset of the second set of PQs (e.g., the second set of measure qubits). When entangling the first subset of PQs with the second subset of PQs, a first set of entangled qubit-pairs is formed. The first set of entangled qubit-pairs is distributed across the first subset of PQs and the second subset of PQs. For instance, the first Z-type measure qubit 452 may be entangled with the second Z-type measure qubit 456 to form a first entangled qubit-pair 462. Likewise, the first X-type measure qubit 454 may be entangled with the second X-type measure qubit 458 to form a second entangled qubit-pair 464. The first entangled qubit-pair 462 and the second entangled qubit-pair 464 are included in the first set of entangled qubit-pairs. Upon entangling the first subset of PQs and the second subset of PQs, the fused LQ 480 may be formed. The fused LQ 480 includes the first LQ 420 and the second LQ 440. The fused LQ further includes a set of fused stabilizers that spans the first LQ 420 and the second LQ 440. For instance, the set of fused stabilizers includes at least the first fused Z-type stabilizer 482 and the first fused X-type stabilizer 486. At least a subset of the first set of entangled qubit-pairs is employed as a set of fused-measure qubits for the set of fused stabilizers. For instance, at least one of the measure qubits of the first fused Z-type measure qubit 484 (e.g., the first Z-type measure qubit 452 or the second Z-type measure qubit 456) is employed as the measure qubit for the first fused Z-type stabilizer 482. Likewise, at least one of the measure qubits of the first fused Z-type measure qubit 488 (e.g., the first X-type measure qubit 454 or the second X-type measure qubit 458) is employed as the measure qubit for the first fused X-type stabilizer 486. A QEC code (e.g., a surface code) may be implemented on the fused LQ 480. The QEC code employs the set of fused stabilizers (e.g., at least the first fused Z-type stabilizer 482 and the first fused X-type stabilizer 486).

The first set of PQs includes a first set of data qubits (e.g., at least the first set of data qubits 422) for the first LQ 420 and a first set of measure qubits (e.g., the first set of measure qubits 424) for the first LQ 420. The first subset of PQs is a first subset of the first set of measure qubits (e.g., the first set of measure qubits 424) that is located on a first LQ boundary of the first LQ 420. The first subset of PQs is a first set of boundary-measure qubits of the first LQ 420. Likewise, the second set of PQs includes a second set of data qubits (e.g., the second set of data qubits 442) for the second LQ 440 and a second set of measure qubits (e.g., the second set of measure qubits 444) for the second LQ 440. The second subset of PQs is a second subset of the second set of measure qubits (e.g., the second set of measure qubits 444) that is located on a second LQ boundary of the second LQ 440. The second subset of PQs is a second set of boundary-measure qubits of the second LQ 440.

As shown in FIG. 4A, the QCS may additionally include a first set of transmission qubits (e.g., the first set of transmission qubits 426). The first set of transmission qubits may be associated with the first LQ 420. Each boundary-measure qubit in the first set of boundary-measure qubits (e.g., the first set of measure qubits 424) is couplable to at least one transmission qubit of the first set of transmission qubits via one or more multi-qubit logic gate types (e.g., a CNOT gate). The QCS may further include a second set of transmission qubits (e.g., the second set of transmission qubits 446). The second set of transmission qubits may be associated with the second LQ 440. Each boundary-measure qubit in the second set of boundary-measure qubits (e.g., the second set of measure qubits 444) is couplable to at least one transmission qubit of the second set of transmission qubits via the one or more multi-qubit logic gate types. The QCS may further include a set of quantum transmission lines (QTLs) (e.g., the set of QTLs 402). The set of QTLs couples each transmission qubit of the first set of transmission qubits to a corresponding transmission qubit of the second set of transmission qubits of the second set of transmission qubits. The set of QTLs is configured to transmit quantum information (e.g., a quantum state) between the first set of transmission qubits and the second set of transmission qubits. For instance, the transmission of quantum information may be uni-directional, such as the uni-directional transmission 300 of FIG. 3A. In other embodiments, the transmission of quantum information may be bi-directional, such as the bi-directional transmission 340 of FIG. 3B.

As also shown in FIG. 4A, the QCS may include a first module (e.g., the first module 410) and a second module (e.g., the second module 530). The first module includes the first set of PQs and the first set of transmission qubits. The second module includes the second set of PQs and the second set of transmission qubits. The second module is physically separate from the first module and the set of QTLs quantumly couples the first module to the second module.

FIG. 5 shows a first quantum circuit 500 that configures a fused logical qubit, according to various embodiments. In FIG. 5, the set of LQ 400 of FIGS. 4A-4B are shown. The set of LQs includes the first module 410 and the second module 430. The first LQ 420 is implemented on the first module 410 and the second LQ 440 is implemented on the second module 430. The set of QTLs 402 couples the first set of transmission qubits 426 of the first module 410 to the second set of transmission qubits 446 of the second module 430. Also shown in FIG. 5 is a fan-out for the first set of data qubits 422, the first set of measure qubits 424, and the first set of transmission qubits 426 of the first module 410 to the first quantum circuit 500. A fan-out for the second set of data qubits 442, the second set of measure qubits 444, and the second set of transmission qubits 446 of the second module 430 to the first quantum circuit 500 are also shown. The set of QTLs 402 of FIG. 4A are also shown in FIG. 5.

The operations of the first quantum circuit 500 will now be discussed. In the first quantum circuit 500, a first set of maximally-entangled qubit pairs (e.g., Bell pairs) is generated in either the first module 410 or the second module 430. Without loss of generality, in the following discussion, it is assumed that the maximally-entangled qubit-qubit pairs are Bell pairs, but other embodiments are not so limited, and other "types" of maximally-entangled qubit pairs may be generated. The quantum state associated with one half of each Bell pair associated with the first set of Bell pairs is transmitted from the generating module to the other module. The transmitted half of the Bell pairs is then "consumed" on the other module. Without loss of generality, in FIG. 5, it is assumed that the first set of Bell pairs is generated in the second module 430. A half of each Bell pair is transmitted from the second module 430 to the first module 410, and consumed via the first module 410.

More specifically, in operation 502a, each measure qubit in the first set of measure qubits 424 is reset via the corresponding reset operations. As marked in the reset operation icons of FIG. 5, in some embodiments, each transmission qubit of the first set of transmission qubits 426 may be, but need not be, reset in operation 502a. In operation 502b, each measure qubit in the second set of measure qubits 444 and each transmission qubit in the second set of transmission qubits 446 are reset via the corresponding reset operation as indicated in the reset icon. In operations 502a and 502b, the basis of the reset for each qubit is indicated in the reset operation icon (e.g., "R" indicates to reset the qubit in the Z-basis (e.g., the computational basis) and "RX" indicates to reset the qubit in the X-basis (e.g., the Hadamard basis)).

In operation 504, the second set of measure qubits 444 and the second set of transmission qubits 446 are entangled via multi-qubit logic gates (e.g., CNOTs). In some embodiments, the entanglement is maximally entangled. For instance, as shown via the reset operations of operation 502b and the CNOT operations of operation 504, a Bell pair is created between the pairs of the second set of measure qubits 444 and the second set of transmission qubits 446. As noted, the set of maximally-entangled qubit-qubit pairs formed in operation 504 need not be Bell pairs, but could be some other maximally-entangled pairs.

In operation 506, the quantum states of the second set of transmission qubits 446 (the quantum state of one of the qubits of the Bell-pairs) are transmitted along the set of QTLs 402 in a uni-directional transmission (e.g., see uni-directional transmission 300 of FIG. 3A) to the first set of transmission qubits 426. After the uni-directional transmission, the quantum states of the second set of transmission qubits 446 may be destroyed because the quantum states of the second set of transmission qubits 446 are now encoded in the first set transmission qubits 426. Thus, after the operation 506, the second set of measure qubits 444 are entangled with the first set of transmission qubits 426. Accordingly, the Bell pairs may be distributed across the first set of transmission qubits 426 and the second set of measure qubits 444. That is, the quantum state of one qubit of the Bell pair (or each Bell pair) may now be encoded in a qubit of the first set of transmission qubits 426 and the quantum state of the other qubit of the Bell pair is still encoded in a corresponding qubit of the second set of measure qubits 444.

Operations 508 and 512 are operations of the QEC code (e.g., a surface code) being implemented on the first LQ 420. In operations 508 and 512, the quantum parities (e.g., Z-type parities and X-type parities) of the first set of data qubits 422 are projected onto the first set of measure qubits 424 via multi-qubit logic gates (e.g., CNOT gates). Likewise, operations 510 and 514 are operations of the QEC code being implemented on the second LQ 440. In operations 510 and 514, the quantum parities (e.g., Z-type parities and X-type parities) of the second set of data qubits 442 are projected onto the second set of measure qubits 444 via multi-qubit logic gates (e.g., CNOT gates).

In operation 516, the one-half of the Bell pairs (or Bell states) are "transferred" (or "consumed") to the first set of measure qubits 424. For instance, via multi-qubit logic gates (e.g., CNOTs), the first pair of transmission qubits 426 are (maximally) entangled with the first set of measure qubits 424. That is, the one-half of the Bell states encoded in the first set of transmission qubits 426 are transferred to the first set of measure qubits 424. As such, the first set of measure qubits 424 are now (maximally) entangled with the second set of measure qubits 444, and the Bell pairs are now distributed across the first set of measure qubits 424 and the second set of measure qubits 444. Thus, the first entangled qubit pair 462 and the second entangled qubit-pair 464 of FIG. 4B are formed via operation 516.

At operation 518a, the quantum states of the first set of measure qubits 424 and the first set of transmission qubits 426 are measured. Similar to the reset operations, the measurement operations and the basis of the measurement operations are indicated by "M" (for a Z-basis measurement) and "MX" (for a X-basis measurement). At operation 518b, the quantum states of the second set of measure qubits 444 are measured according to the indicated basis.

Thus, via the terminology used in conjunction with fused LQ 480 of FIG. 4B, entangling the first subset of PQs (e.g., the first set of measure qubits 424) with the second subset of PQs (e.g., the second set of measure qubits 444), via the first quantum circuit 500 of FIG. 5, may include generating the first set of entangled qubit-pairs (e.g., including first entangled qubit-pair 462 and second entangled qubit pair 464 of FIG. 4B). The second set of transmission qubits 446 includes a first qubit of each entangled qubit-pair of the first set of entangled qubit-pairs. The second set of boundary-measure qubits (e.g., the second set of measure qubits 444) includes a second qubit of each entangled qubit-pair of the first set of entangled qubit-pairs. When generating the first set of entangled qubit-pairs, the one or more multi-qubit logic gate types (e.g., CNOT gates) are employed to entangle the second set of boundary-measure qubits with the second set of transmission qubits 446 (e.g., see operation 504 of first quantum circuit 500). For each entangled qubit-pair of the first set of entangled qubit-pairs, a quantum state of the first qubit of the entangled qubit-pair is transmitted, via a corresponding QTL of the set of QTLs 402, from the second set of transmission qubits 446 to the first set of transmission qubits 426 (e.g., see operation 506 of first quantum circuit 500). The first set of transmission qubits 426 now encodes the quantum statue of the first qubit of each entangled qubit-pair of the set of entangled qubit-pairs. The second set of boundary-measure qubits (e.g., the second set of measure qubits 444) encodes a quantum state of the second qubit of each entangled qubit-pair of the set of entangled qubit-pairs. Via the one or more multi-qubit logic gate types (e.g., CNOT gates), the first set of transmission qubits 426 may be entangled with the first set of boundary-measure qubits (e.g., the first set of measure qubits 424). For instance, see operation 516. The first set of boundary-measure qubits now encodes the quantum state of the first qubit of each entangled qubit-pair of the first set of entangled qubit-pairs, resulting in an entanglement between the first subset of PQs (e.g., the first set of measure qubits 424) and the second subset of PQs (e.g., the second set of measure qubits 444).

In some embodiments, generating the first set of entangled qubit pairs includes generating a first set of Bell pairs via the one or more multi-qubit logic gate types (e.g., see operations 502b and 504). The first set of entangled qubit-pairs may be the first set of Bell pairs. The first qubit of each entangled qubit pair of the first set of entangled qubit-pairs is a first-half of a separate Bell pair of the first set of Bell pairs. The second qubit of each entangled qubit pair of the first set of entangled qubit-pairs is a second-half of the separate Bell pair of the first set of Bell pairs. The first-half of each Bell pair of the first set of Bell pairs is included in the second set of transmission qubits 446. The second-half of each Bell pair of the first set Bell pairs is included in second set of boundary-measure qubits (e.g., the second set of measure qubits 444).

First quantum circuit 500 generates a single set of Bell pairs on the second module 430 and transfer one-half of the quantum state of each Bell pair of the single set of Bell pairs to the first module 410, resulting in a (maximal) entanglement between qubit-pairs, where one half of each entangled qubit-pair is in the first set of measure qubits 424 and the other half of each entangled qubit-pair is in a corresponding qubit in the second set of measure qubits 444. That is, the Bell pair is "consumed" on the module that is opposite to the module where the Bell pair was generated. As discussed in conjunction with FIG. 6, another quantum circuit (e.g., second quantum circuit 600 of FIG. 6), performs similar operations.

FIG. 6 shows a second quantum circuit 600 that configures a fused logical qubit, according to various embodiments. FIG. 6 shows similar features to the features shown in FIG. 5. For instance, FIG. 6 shows the set of LQ 400 of FIGS. 4A-4B. Just as in FIG. 5, in FIG. 6, the set of LQs includes the first module 410 and the second module 430. The first LQ 420 is implemented on the first module 410 and the second LQ 440 is implemented on the second module 430. The set of QTLs 402 couples the first set of transmission qubits 426 of the first module 410 to the second set of transmission qubits 446 of the second module 430. Also shown in FIG. 6 is a fan-out for the first set of data qubits 422, the first set of measure qubits 424, and the first set of transmission qubits 426 of the first module 410 to the first quantum circuit 500. A fan-out for the second set of data qubits 442, the second set of measure qubits 444, and the second set of transmission qubits 446 of the second module 430 to the first quantum circuit 500 are also shown. The set of QTLs 402 of FIG. 4A are also shown in FIG. 6.

The operations of the second quantum circuit 600 will now be discussed. In the second quantum circuit 600, two sets of Bell pairs are generated. Similar to the first quantum circuit 500 of FIG. 5, the first set of Bell pairs is generated on the second module 430. Also similar to the first quantum circuit 500, one half of each Bell pair of the first set of Bell pairs is transmitted to and consumed by the first module 410. In the second quantum circuit 600, in addition to the first set of Bell pairs, a second set of Bell pairs is generated on the first module 410. One half of each Bell pair of the second set of Bell pairs is transmitted to and consumed by the second module 430. The two halves of the Bell pairs may be transmitted to the other module via a quantum swap operation. The extra Bell pairs provide a flag for errors during the transmission of the quantum information.

Operation 602 is similar to operations 502a and 502b of the first quantum circuit 500. Namely, in operation 602, each qubit in the first set of measure qubits 424, the second set of measure qubits 444, the first set of transmission qubits 426, and the second set of transmission qubits 446 are rest in the basis indicated in the reset operation icons.

Operation 604b is similar to operation 504 of the first quantum circuit 500. Namely, in operation 604b, the second set of measure qubits 444 and the second set of transmission qubits 446 are entangled via multi-qubit logic gates (e.g., CNOTs). In some embodiments, the entanglement is maximally entangled. For instance, in operation 604b, a first set of Bell pairs is created between the pairs of the second set of measure qubits 444 and the second set of transmission qubits 446. As noted, the set of maximally-entangled qubit-qubit pairs formed in operation 604b need not be Bell pairs, but could be some other maximally-entangled pairs.

Operation 604a is a mirror operation to operation 604b, in that the first set of measure qubits 424 and the first set of transmission qubits 426 are entangled via multi-qubit logic gates (e.g., CNOTs). In some embodiments, the entanglement is maximally entangled. For instance, in operation 604a, a second set of Bell pairs is created between the pairs of the first set of measure qubits 424 and the first set of transmission qubits 426.

In operation 606, the quantum states in the first set of transmission qubits 426 (e.g., which are maximally entangled with the first set of measure qubits 424 via operation 602) and the quantum states of in the second set of transmission qubits 446 (e.g., which are maximally entangled with the second set of measure qubits 444 via operation 602) are swapped (e.g., see bi-directional transmission 340 of FIG. 3B) via the set of QTLs. After the bi-directional transmission (e.g., the swap operations), the second set of measure qubits 444 are entangled with the first set of transmission qubits 426 and the first set of measure qubits 424 are entangled with the second set of transmission qubits 446. Accordingly, the first set of Bell pairs may be distributed across the first set of transmission qubits 426 and the second set of measure qubits 444, while the second set of Bell pairs is distributed across the second set of transmission qubits 446 and the first set of measure qubits 424.

Operations 608 and 612 are analogous to operations 508 and 512 of the first quantum circuit 500 and operations 610 and 612 are analogous to operations 510 and 514 of the first quantum circuit 500. That is, operations 608 and 612 are operations of the QEC code (e.g., a surface code) being implemented on the first LQ 420. In operations 608 and 612, the quantum parities (e.g., Z-type parities and X-type parities) of the first set of data qubits 422 are projected onto the first set of measure qubits 424 via multi-qubit logic gates (e.g., CNOT gates). Likewise, operations 610 and 614 are operations of the QEC code being implemented on the second LQ 440. In operations 610 and 614, the quantum parities (e.g., Z-type parities and X-type parities) of the second set of data qubits 442 are projected onto the second set of measure qubits 444 via multi-qubit logic gates (e.g., CNOT gates).

Operation 616a and operation 616b are analogous to operation 516 of the first quantum circuit 500. In operation 516a, the one-half of the first set of Bell pairs (or Bell states) are "transferred" (or "consumed") to the first set of measure qubits 424. For instance, via multi-qubit logic gates (e.g., CNOTs), the first pair of transmission qubits 526 are (maximally) entangled with the first set of measure qubits 424. That is, the one-half of the first set of Bell states encoded in the first set of transmission qubits 426 are transferred to the first set of measure qubits 424. As such, the first set of measure qubits 424 are now (maximally) entangled with the second set of measure qubits 444, and the first set of Bell pairs are now distributed across the first set of measure qubits 424 and the second set of measure qubits 444. Thus, the first entangled qubit pair 462 and the second entangled qubit-pair 464 of FIG. 4B are formed via operation 516a.

Operation 616b is the analog of operation 616a, except occurring in the second module 430. That is, in operation 616b, the one-half of the second set of Bell pairs (or Bell states) are "transferred" (or "consumed") to the second set of measure qubits 444. For instance, via multi-qubit logic gates (e.g., CNOTs), the second pair of transmission qubits 546 are (maximally) entangled with the second set of measure qubits 444. That is, the one-half of the second set of Bell states encoded in the second set of transmission qubits 426 are transferred to the second set of measure qubits 444. As such, the second set of measure qubits 444 are now (maximally) entangled with the first set of measure qubits 424, and the second set of Bell pairs are now distributed across the second set of measure qubits 444 and the first set of measure qubits 424. The second set of Bell pairs may serve as a flag to detect errors in the swap operations of operation 606.

Operation 618 is analogous to operations 518a and 518b of the first quantum circuit 500. That is, in operation 618, the first set of measure qubits 424, the first set of transmission qubits 426, the second set of transmission qubits 446, and the second set of measure qubits 444 may be measured in the basis as indicated by the measure icons (e.g., "M" and "Mx").

FIG. 7 shows a third quantum circuit 700 that configures a fused logical qubit, according to the various embodiments. FIG. 7 shows similar features to the features shown in FIGS. 5-6. For instance, FIG. 7 shows the set of LQ 400 of FIGS. 4A-4B. Just as in FIGS. 5-6, in FIG. 7, the set of LQs includes the first module 410 and the second module 430. The first LQ 420 is implemented on the first module 410 and the second LQ 440 is implemented on the second module 430. The set of QTLs 402 couples a first set of transmission qubits 426a of the first module 410 to a second set of transmission qubits 446a of the second module 430. Note that the first set of transmission qubits 426a has half the number of transmission qubits as compared to the first set of transmission qubits 426 of the first quantum circuit 500 and the second quantum circuit 600. Likewise, the second set of transmission qubits 446a has half the number of transmission qubits as compared to the second set of transmission qubits 446 of the first quantum circuit 500 and the second quantum circuit 600. Also shown in FIG. 6 is a fan-out for the first set of data qubits 422, the first set of measure qubits 424, and the first set of transmission qubits 426a of the first module 410 to the first quantum circuit 500. A fan-out for the second set of data qubits 442, the second set of measure qubits 444, and the second set of transmission qubits 446b of the second module 430 to the first quantum circuit 500 are also shown. The set of QTLs 402 of FIG. 4A are also shown in FIG. 7.

As mentioned above, the third quantum circuit 700 only requires half the number of transmission qubits that the first quantum circuit 500 and the second quantum circuit 600 do. That is, the quantum states of both the "X" stabilizer measure qubits and the "Z" stabilizer measure qubits are transmitted over the set of QTLs. Thus, only half the number of QTLs are required in the third quantum circuit 700. Like the second quantum circuit 600, two sets of Bell pairs are generated in the third quantum circuit 700.

Operation 702 is similar to operation 602 of the second quantum circuit 600. Namely, in operation 702, each qubit in the first set of measure qubits 424, the second set of measure qubits 444, the first set of transmission qubits 426a, and the second set of transmission qubits 446a are rest in the basis indicated in the reset operation icons.

Operation 704a is similar to operation 604a and operation 704b is similar to operation 604b of the second quantum circuit 500. Namely, in operation 704b, the second set of measure qubits 444 and the second set of transmission qubits 446a are entangled via multi-qubit logic gates (e.g., CNOTs). In some embodiments, the entanglement is maximally entangled. For instance, in operation 704b, a first set of Bell pairs is created between the pairs of the second set of measure qubits 444 and the second set of transmission qubits 446a. As noted, the set of maximally-entangled qubit-qubit pairs formed in operation 704b need not be Bell pairs, but could be some other maximally-entangled pairs.

Operation 704a is a mirror operation to operation 704b, in that the first set of measure qubits 424 and the first set of transmission qubits 426a are entangled via multi-qubit logic gates (e.g., CNOTs). In some embodiments, the entanglement is maximally entangled. For instance, in operation 704a, a second set of Bell pairs is created between the pairs of the first set of measure qubits 424 and the first set of transmission qubits 426.

In operation 706, the quantum states in the first set of transmission qubits 426 (e.g., which are maximally entangled with the first set of measure qubits 424 via operation 602) and the quantum states of in the second set of transmission qubits 446a (e.g., which are maximally entangled with the second set of measure qubits 444 via operation 602) are swapped (e.g., see bi-directional transmission 340 of FIG. 3B) via the set of QTLs. After the bi-directional transmission (e.g., the swap operations), the second set of measure qubits 444 are entangled with the first set of transmission qubits 426a and the first set of measure qubits 424 are entangled with the second set of transmission qubits 446a. Accordingly, the first set of Bell pairs may be distributed across the first set of transmission qubits 426a and the second set of measure qubits 444, while the second set of Bell pairs is distributed across the second set of transmission qubits 446b and the first set of measure qubits 424.

Operations 708 and 712 are analogous to operations 508 and 512 of the first quantum circuit 500 and operations 710 and 712 are analogous to operations 510 and 514 of the first quantum circuit 500. That is, operations 708 and 712 are operations of the QEC code (e.g., a surface code) being implemented on the first LQ 420. In operations 708 and 712, the quantum parities (e.g., Z-type parities and X-type parities) of the first set of data qubits 422 are projected onto the first set of measure qubits 424 via multi-qubit logic gates (e.g., CNOT gates). Likewise, operations 710 and 714 are operations of the QEC code being implemented on the second LQ 440. In operations 710 and 714, the quantum parities (e.g., Z-type parities and X-type parities) of the second set of data qubits 442 are projected onto the second set of measure qubits 444 via multi-qubit logic gates (e.g., CNOT gates).

Operation 716b is analogous to operation 616b of the second quantum circuit 600. Operation 716a is analogous to operation 616a of the second quantum circuit 600. Operation 718 is analogous to operation 618 of the second quantum circuit 600. That is, in operation 718, the first set of measure qubits 424, the first set of transmission qubits 426a, the second set of transmission qubits 446a, and the second set of measure qubits 444 may be measured in the basis as indicated by the measure icons (e.g., "M" and "Mx").

Example Methods for Operating a Fault-Tolerant Quantum Computing System

FIG. 8 depicts a flow chart diagram of an example method 800 for operating a fault-tolerant quantum computing system (QCS), according to various embodiments. The QCS includes a first set of physical qubits (PQs) that forms a first logical qubit (LQ) and a second set of PQs that forms a second LQ. Method 800 may be performed by any of the first quantum circuit 500 of FIG. 5, the second quantum circuit 600 of FIG. 6, the third quantum circuit 700 of FIG. 7, and/or other circuits that are the equivalents and/or variants of these quantum circuits. Method 800 begins at block 802, where a first subset of the first set of PQs is entangled with a second subset of the second set of PQs. A first set of entangled qubit-pairs is formed and the first set of entangled qubit-pairs is distributed across the first subset of PQs and the second subset of PQs. At block 804, a fused LQ is formed. The fused LQ includes the first LQ and the second LQ. The fused LQ further includes a set of fused stabilizers that spans the first LQ and the second LQ. At least a subset of the first set of entangled qubit-pairs is employed as a set of fused-measure qubits for the set of fused stabilizers. At block 806, a quantum error correction (QEC) code is implemented on the fused LQ. The QEC code employs the set of fused stabilizers.

For each of the three circuits, the first set of PQs includes a first set of data qubits for the first LQ and a first set of measure qubits for the first LQ. The first subset of PQs is a first subset of the first set of measure qubits that is located on a first LQ boundary of the first LQ. The first subset of PQs is a first set of boundary-measure qubits of the first LQ. The second set of PQs includes a second set of data qubits for the second LQ and a second set of measure qubits for the second LQ. The second subset of PQs is a second subset of the second set of measure qubits that is located on a second LQ boundary of the second LQ. The second subset of PQs is a second set of boundary-measure qubits of the second LQ.

In each of the three circuits, the QCS may further include a first set of transmission qubits that is associated with the first LQ. Each boundary-measure qubit in the first set of boundary-measure qubits is couplable to at least one transmission qubit of the first set of transmission qubits via one or more multi-qubit logic gate types. The QCS may further include a second set of transmission qubits that is associated with the second LQ. Each boundary-measure qubit in the second set of boundary-measure qubits is couplable to at least one transmission qubit of the second set of transmission qubits via the one or more multi-qubit logic gate types. The QCS may further include a set of quantum transmission lines (QTLs) that couples each transmission qubit of the first set of transmission qubits to a corresponding transmission qubit of the second set of transmission qubits. The set of QTLs is configured to transmit quantum information between the first set of transmission qubits and the second set of transmission qubits.

As noted above, the QCS may further include a first module that includes the first set of PQs and the first set of transmission qubits. The QCS may further include a second module that includes the second set of PQs and the second set of transmission qubits. The second module is physically separate from the first module. The set of QTLs quantumly couples the first module to the second module.

For each of the three circuits, entangling the first subset of PQs with the second subset of PQs comprises generating the first set of entangled qubit-pairs such that the second set of transmission qubits includes a first qubit of each entangled qubit-pair of the first set of entangled qubit-pairs and the second set of boundary-measure qubits includes a second qubit of each entangled qubit-pair of the first set of entangled qubit-pairs. When generating the first set of entangled qubit-pairs, the one or more multi-qubit logic gate types are employed to entangle the second set of boundary-measure qubits with the second set of transmission qubits. For each entangled qubit-pair of the first set of entangled qubit-pairs, a quantum state of the first qubit of the entangled qubit-pair is transmitted, via a corresponding QLT of the set of QLTs, from the second set of transmission qubits to the first set of transmission qubits. The first set of transmission qubits encodes the quantum statue of the first qubit of each entangled qubit-pair of the set of entangled qubit-pairs. The second set of boundary-measure qubits encodes a quantum state of the second qubit of each entangled qubit-pair of the set of entangled qubit-pairs. Via the one or more multi-qubit logic gate types, the first set of transmission qubits is entangled with the first set of boundary-measure qubits. The first set of boundary-measure qubits encodes the quantum state of the first qubit of each entangled qubit-pair of the first set of entangled qubit-pairs, resulting in an entanglement between the first subset of PQs and the second subset of PQs. As discussed throughout, the one or more multi-qubit logic gate types may include a CNOT gate.

For each of the three circuits, generating the first set of entangled qubit-pairs comprises generating a first set of Bell pairs via the one or more multi-qubit logic gate types. The first set of entangled qubit-pairs is the first set of Bell pairs. The first qubit of each entangled qubit pair of the first set of entangled qubit-pairs is a first-half of a separate Bell pair of the first set of Bell pairs. The second qubit of each entangled qubit pair of the first set of entangled qubit pairs is a second-half of the separate Bell pair of the first set of Bell pairs. The first-half of each Bell pair of the first set of Bell pairs is included in the second set of transmission qubits. The second-half of each Bell pair of the first set Bell pairs is included in the second set of boundary-measure qubit.

In some embodiments, transmitting the quantum state of the first qubit of the entangled qubit-pair from the second set of transmission qubits to the first set of transmission qubits includes transmitting, via a uni-directional transmission over the corresponding QTL of the set of QTLS, the second-half of each Bell pair of the first set of Bell pairs, from the second set of transmission qubits to the first set of transmission qubits. For instance, see first quantum circuit 500 of FIG. 5. In other embodiments, the transmission is a bi-directional transmission. For instance, see the second quantum circuit 600 of FIG. 6 and the third quantum circuit 700 of FIG. 7.

In all three quantum circuits, entangling the first set of transmission qubits with the first set of boundary-measure qubits includes transferring, via the one or more multi-qubit logic gate types, the second-half of each Bell pair of the first set of Bell pairs, from the first set of transmission qubits to the first set of measure qubits via the one or more multi-qubit logic gate types.

For all three quantum circuits, implementing the QEC code on the fused LQ may include measuring each measure qubit in the first set of measure qubits, wherein the first set of measure qubits are employed as measure qubits for the set of fused stabilizers.

In some embodiments (e.g., see the first quantum circuit 500 and/or the second quantum circuit 600), there is a first one-to-one correspondence between the first set of measure qubits and the first set of transmission qubits (e.g., see the first quantum circuit 500 and/or see the second quantum circuit 600). In such embodiments, there is a second one-to-one correspondence between the second set of measure qubits and the second set of transmission qubits. There may be a third one-to-one correspondence between the first set of transmission qubits and the second set of transmission qubits. There may also be a fourth one-to-one correspondence between the first set of measure qubits and the second set of measure qubits via the first one-to-one correspondence, the second one-to-one correspondence, and the third one-to-one correspondence.

In some embodiments (e.g., see the first quantum circuit 500 and/or the second quantum circuit 600), method 800 further includes performing a first reset operation on a first measure qubit of the first set of measure qubits. The first reset operation is performed in a first measurement-basis (e.g., the X-basis or the Z-basis). A second reset operation is performed on a first transmission qubit of the first set of transmission qubits. The second reset operation is performed in a second measure-basis (e.g., the Z-basis or the X-basis). The second measurement-basis is orthogonal to the first measurement-basis. The first measure qubit corresponds to the first transmission qubit via the first one-to-one correspondence. A third reset operation is performed on a second measure qubit of the second set of measure qubits. The third reset operation is performed in the first measurement-basis. A fourth reset operation is performed on a second transmission qubit of the second set of transmission qubits. The fourth reset operation is performed in the second measurement-basis. The second measure qubit corresponds to the second transmission qubit via the second one to correspondence. The first transmission qubit corresponds to the second transmission qubit via the third one-to-one correspondence.

In some embodiments, entangling the first subset of PQs with the second subset of PQs includes generating the first set of entangled qubit-pairs. The second set of transmission qubits includes a first qubit of each entangled qubit-pair of the first set of entangled qubit-pairs. The second set of boundary-measure qubits includes a second qubit of each entangled qubit-pair of the first set of entangled qubit-pairs. When generating the first set of entangled qubit-pairs, the one or more multi-qubit logic gate types are employed to entangle the second set of boundary-measure qubits with the second set of transmission qubits. A second set of entangled qubit-pairs is generated. (e.g., see the second quantum circuit 600 and/or the third quantum circuit 700). The first set of transmission qubits includes a first qubit of each entangled qubit-pair of the second set of entangled qubit-pairs. The first set of boundary-measure qubits includes a second qubit of each entangled qubit-pair of the second set of entangled qubit-pairs. When generating the second set of entangled qubit-pairs, the one or more multi-qubit logic gate types are employed to entangle the first set of boundary-measure qubits with the first set of transmission qubits. Quantum states are swapped, via bi-directional swap operations (e.g., see FIG. 3B) along the set of QLTs, between the first qubits of the first set of entangled qubit-pairs and the first qubits of the second set of entangled qubit-pairs. Quantum states of the first qubits of the first set of entangled qubit-pairs are encoded in the first set of transmission qubits. Quantum states of the second qubits of the first set of entangled qubit-pairs are encoded in the second set of boundary-measure qubits. Quantum states of the first qubits of the second set of entangled qubit-pairs are encoded in the second set of transmission qubits. Quantum states of the second qubits of the second set of entangled qubit-pairs are encoded in the first set of boundary-measure qubits. The second set of transmission qubits are measured. A set of flag operations for the bi-directional swap operations are performed. The set of flag operations are based on measuring the second set of transmission qubits. The set of flag operations are configured to detect transmission errors occurring in the bi-directional swap operations (e.g., see the second quantum circuit 600).

In some embodiments, entangling the first subset of PQs with the second subset of PQs includes generating the first set of entangled qubit-pairs such that the second set of transmission qubits includes a first qubit of each entangled qubit-pair of the first set of entangled qubit-pairs. The second set of boundary-measure qubits includes a second qubit of each entangled qubit-pair of the first set of entangled qubit-pairs. When generating the first set of entangled qubit-pairs, the one or more multi-qubit logic gate types are employed to entangle the second set of boundary-measure qubits with the second set of transmission qubits. A second set of entangled qubit-pairs is generated such that the first set of transmission qubits includes a first qubit of each entangled qubit-pair of the second set of entangled qubit-pairs. The first set of boundary-measure qubits includes a second qubit of each entangled qubit-pair of the second set of entangled qubit-pairs. When generating the second set of entangled qubit-pairs, the one or more multi-qubit logic gate types are employed to entangle the first set of boundary-measure qubits with the first set of transmission qubits.

In some embodiments, each transmission qubit of the first set of transmission qubits corresponds to two separate measure qubits of the first set of measure qubits (e.g., see the third quantum circuit 700 of FIG. 7). Each transmission qubit of the second set of transmission qubits corresponds to two separate measure qubits of the second set of measure qubits (e.g., see the third quantum circuit 700 of FIG. 7). Each measure qubit of the first set of measure qubits corresponds to a single transmission qubit of the first set of transmission qubits. Each measure qubit of the second set of measure qubits corresponds to a single transmission qubit of the second set of transmission qubits. There may be a first one-to-one correspondence between the first set of transmission qubits and the second set of transmission qubits. There may be a second one-to-one correspondence between the first set of measure qubits and the second set of measure qubits.

In some embodiments (e.g., see the third quantum circuit 700), method 800 further includes performing a first reset operation on a first measure qubit of the first set of measure qubits. The first reset operation is performed in a first measurement-basis (e.g., the X-basis or the Z-basis). A second reset operation is performed on a second measure qubit of the first set of measure qubits. The second reset operation is performed in a second measurement-basis (e.g., the Z-basis or the X-basis) that is orthogonal to the first measurement-basis. A third reset operation is performed on a first transmission qubit of the first set of transmission qubits. The third reset operation is performed in the second measurement-basis and the first transmission qubit corresponds to each of the first measure qubit and the second measure qubit. A fourth reset operation is performed on a third measure qubit of the second set of measure qubits. The fourth reset operation is performed in the first measurement-basis. A fifth reset operation is performed on a fourth measure qubit of the second set of measure qubits. The fifth reset operation is performed in the second measurement-basis. A sixth reset operation is performed on a second transmission qubit of the second set of transmission qubits. The sixth reset operation is performed in the first measurement-basis. The second transmission qubit corresponds to each of the third measure qubit and the fourth measure qubit. The first transmission qubit corresponds to the second transmission qubit via the first one-to-one correspondence. The first measure qubit corresponds to the third measure qubit via the second one-to-one correspondence. The second measure qubit corresponds to the fourth measure qubit via the second one-to-one correspondence.

In some embodiments, a first entangled-qubit pair of the first set of entangled qubit pairs includes the third measure qubit and the second transmission qubit. A second entangled-qubit pair of the second set of entangled qubit pairs includes the first measure qubit and the first transmission qubit.

In some embodiments, method 800 further includes performing a transversal multi-qubit logic gate between the first LQ and the second LQ by employing local qubit-interactions across the fused LQ. The QEC code may be a topological surface code.

Additional Embodiments

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively, or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for operating a fault-tolerant quantum computing system (QCS) that includes a first set of physical qubits (PQs) that forms a first logical qubit (LQ) and a second set of PQs that forms a second LQ, the method comprising:

entangling a first subset of the first set of PQs with a second subset of the second set of PQs such that a first set of entangled qubit-pairs is formed and the first set of entangled qubit-pairs is distributed across the first subset of PQs and the second subset of PQs;

forming a fused LQ that includes the first LQ and the second LQ, wherein the fused LQ further includes a set of fused stabilizers that spans the first LQ and the second LQ, and wherein at least a subset of the first set of entangled qubit-pairs is employed as a set of fused-measure qubits for the set of fused stabilizers; and implementing a quantum error correction (QEC) code on the fused LQ, wherein the QEC code employs the set of fused stabilizers.

2. The method of claim 1, wherein the first set of PQs includes a first set of data qubits for the first LQ and a first set of measure qubits for the first LQ, wherein the first subset of PQs is a first subset of the first set of measure qubits that is located on a first LQ boundary of the first LQ such that the first subset of PQs is a first set of boundary-measure qubits of the first LQ; and the second set of PQs includes a second set of data qubits for the second LQ and a second set of measure qubits for the second LQ, wherein the second subset of PQs is a second subset of the second set of measure qubits that is located on a second LQ boundary of the second LQ such that the second subset of PQs is a second set of boundary-measure qubits of the second LQ.

3. The method of claim 2, wherein the QCS further includes:

a first set of transmission qubits that is associated with the first LQ, wherein each boundary-measure qubit in the first set of boundary-measure qubits is coupable to at least one transmission qubit of the first set of transmission qubits via one or more multi-qubit logic gate types;

a second set of transmission qubits that is associated with the second LQ, wherein each boundary-measure qubit in the second set of boundary-measure qubit is coupable to at least one transmission qubit of the second set of transmission qubits via the one or more multi-qubit logic gate types; and a set of quantum transmission lines (QTLs) that couples each transmission qubit of the first set of transmission qubits to a corresponding transmission qubit of the second set of transmission qubits, wherein the set of QTLs is configured to transmit quantum information between the first set of transmission qubits and the second set of transmission qubits.

4. The method of claim 3, wherein the QCS further includes:

a first module that includes the first set of PQs and the first set of transmission qubits; and a second module that includes the second set of PQs and the second set of transmission qubits, wherein the second module is physically separate from the first module and the set of QTLs quantumly couples the first module to the second module.

5. The method of claim 3, wherein entangling the first subset of PQs with the second subset of PQs comprises:

generating the first set of entangled qubit-pairs such that the second set of transmission qubits includes a first qubit of each entangled qubit-pair of the first set of entangled qubit-pairs and the second set of boundary-measure qubits includes a second qubit of each entangled qubit-pair of the first set of entangled qubit-pairs, wherein when generating the first set of entangled qubit-pairs, the one or more multi-qubit logic gate types are employed to entangle the second set of boundary-measure qubits with the second set of transmission qubits;

for each entangled qubit-pair of the first set of entangled qubit-pairs, transmitting a quantum state of the first qubit of the entangled qubit-pair, via a corresponding QLT of the set of QLTs, from the second set of transmission qubits to the first set of transmission qubits such that the first set of transmission qubits encodes the quantum state of the first qubit of each entangled qubit-pair of the set of entangled qubit-pairs and the second set of boundary-measure qubits encodes a quantum state of the second qubit of each entangled qubit-pair of the set of entangled qubit-pairs; and entangling, via the one or more multi-qubit logic gate types, the first set of transmission qubits with the first set of boundary-measure qubits such that the first set of boundary-measure qubits encodes the quantum state of the first qubit of each entangled qubit-pair of the first set of entangled qubit-pairs, resulting in an entanglement between the first subset of PQs and the second subset of PQs.

6. The method of claim 5, wherein the one or more multi-qubit logic gate types includes a CNOT gate.

7. The method of claim 5, wherein generating the first set of entangled qubit-pairs comprises:

generating a first set of Bell pairs via the one or more multi-qubit logic gate types, wherein the first set of entangled qubit-pairs is the first set of Bell pairs, the first qubit of each entangled qubit pair of the first set of entangled qubit-pairs is a first-half of a separate Bell pair of the first set of Bell pairs and the second qubit of each entangled qubit pair of the first set of entangled qubit-pairs is a second-half of the separate Bell pair of the first set of Bell pairs such that the first-half of each Bell pair of the first set of Bell pairs is included in the second set of transmission qubits and the second-half of each Bell pair of the first set Bell pairs is included in the second set of boundary-measure qubits.

8. The method of claim 7, wherein transmitting the quantum state of the first qubit of the entangled qubit-pair from the second set of transmission qubits to the first set of transmission qubits comprises:

transmitting, via a uni-directional transmission over the corresponding QTL of the set of QTLS, the second-half of each Bell pair of the first set of Bell pairs, from the second set of transmission qubits to the first set of transmission qubits.

9. The method of claim 8, wherein entangling the first set of transmission qubits with the first set of boundary-measure qubits comprises:

transferring, via the one or more multi-qubit logic gate types, the second-half of each Bell pair of the first set of Bell pairs, from the first set of transmission qubits to the first set of measure qubits via the one or more multi-qubit logic gate types.

10. The method of claim 5, wherein implementing the QEC code on the fused LQ comprises:

measuring each measure qubit in the first set of measure qubits, wherein the first set of measure qubits are employed as measure qubits for the set of fused stabilizers.

11. The method of claim 3, wherein:

there is a first one-to-one correspondence between the first set of measure qubits and the first set of transmission qubits;

there is a second one-to-one correspondence between the second set of measure qubits and the second set of transmission qubits;

there is a third one-to-one correspondence between the first set of transmission qubits and the second set of transmission qubits; and there is a fourth one-to-one correspondence between the first set of measure qubits and the second set of measure qubits via the first one-to-one correspondence, the second one-to-one correspondence, and the third one-to-one correspondence.

12. The method of claim 11, the method further comprising:

performing a first reset operation on a first measure qubit of the first set of measure qubits, wherein the first reset operation is performed in a first measurement-basis;

performing a second reset operation on a first transmission qubit of the first set of transmission qubits, wherein the second reset operation is performed in a second measure-basis that is orthogonal to the first measurement-basis and the first measure qubit corresponds to the first transmission qubit via the first one-to-one correspondence;

performing a third reset operation on a second measure qubit of the second set of measure qubits, wherein the third reset operation is performed in the first measurement-basis; and performing a fourth reset operation on a second transmission qubit of the second set of transmission qubits, wherein the fourth reset operation is performed in the second measurement-basis, the second measure qubit corresponds to the second transmission qubit via the second one to correspondence, and the first transmission qubit corresponds to the second transmission qubit via the third one-to-one correspondence.

13. The method of claim 3, wherein entangling the first subset of PQs with the second subset of PQs comprises:

generating the first set of entangled qubit-pairs such that the second set of transmission qubits includes a first qubit of each entangled qubit-pair of the first set of entangled qubit-pairs and the second set of boundary-measure qubits includes a second qubit of each entangled qubit-pair of the first set of entangled qubit-pairs, wherein when generating the first set of entangled qubit-pairs, the one or more multi-qubit logic gate types are employed to entangle the second set of boundary-measure qubits with the second set of transmission qubits;

generating a second set of entangled qubit-pairs such that the first set of transmission qubits includes a first qubit of each entangled qubit-pair of the second set of entangled qubit-pairs and the first set of boundary-measure qubits includes a second qubit of each entangled qubit-pair of the second set of entangled qubit-pairs, wherein when generating the second set of entangled qubit-pairs, the one or more multi-qubit logic gate types are employed to entangle the first set of boundary-measure qubits with the first set of transmission qubits;

swapping quantum states, via bi-directional swap operations along the set of QLTs, between the first qubits of the first set of entangled qubit-pairs and the first qubits of the second set of entangled qubit-pairs such quantum states of the first qubits of the first set of entangled qubit-pairs are encoded in the first set of transmission qubits, quantum states of the second qubits of the first set of entangled qubit-pairs are encoded in the second set of of boundary-measure qubits, quantum states of the first qubits of the second set of entangled qubit-pairs are encoded in the second set of transmission qubits, and quantum states of the second qubits of the second set of entangled qubit-pairs are encoded in the first set of boundary-measure qubits;

measuring the second set of transmission qubits; and performing a set of flag operations for the bi-directional swap operations based on measuring the second set of transmission qubits, wherein the set of flag operations are configured to detect transmission errors occurring in the bi-directional swap operations.

14. The method of claim 3, wherein entangling the first subset of PQs with the second subset of PQs comprises:

generating the first set of entangled qubit-pairs such that the second set of transmission qubits includes a first qubit of each entangled qubit-pair of the first set of entangled qubit-pairs and the second set of boundary-measure qubits includes a second qubit of each entangled qubit-pair of the first set of entangled qubit-pairs, wherein when generating the first set of entangled qubit-pairs, the one or more multi-qubit logic gate types are employed to entangle the second set of boundary-measure qubits with the second set of transmission qubits; and generating a second set of entangled qubit-pairs such that the first set of transmission qubits includes a first qubit of each entangled qubit-pair of the second set of entangled qubit-pairs and the first set of boundary-measure qubits includes a second qubit of each entangled qubit-pair of the second set of entangled qubit-pairs, wherein when generating the second set of entangled qubit-pairs, the one or more multi-qubit logic gate types are employed to entangle the first set of boundary-measure qubits with the first set of transmission qubits.

15. The method of claim 14, wherein:

each transmission qubit of the first set of transmission qubits corresponds to two separate measure qubits of the first set of measure qubits;

each transmission qubit of the second set of transmission qubits corresponds to two separate measure qubits of the second set of measure qubits;

each measure qubit of the first set of measure qubits corresponds to a single transmission qubit of the first set of transmission qubits;

each measure qubit of the second set of measure qubits corresponds to a single transmission qubit of the second set of transmission qubits;

there is a first one-to-one correspondence between the first set of transmission qubits and the second set of transmission qubits; and there is a second one-to-one correspondence between the first set of measure qubits and the second set of measure qubits.

16. The method of claim 15, the method further comprising:

performing a first reset operation on a first measure qubit of the first set of measure qubits, wherein the first reset operation is performed in a first measurement-basis;

performing a second reset operation on a second measure qubit of the first set of measure qubits, wherein the second reset operation is performed in a second measurement-basis that is orthogonal to the first measurement-basis;

performing a third reset operation on a first transmission qubit of the first set of transmission qubits, wherein the third reset operation is performed in the second measurement-basis and the first transmission qubit corresponds to each of the first measure qubit and the second measure qubit;

performing a fourth reset operation on a third measure qubit of the second set of measure qubits, wherein the fourth reset operation is performed in the first measurement-basis;

performing a fifth reset operation on a fourth measure qubit of the second set of measure qubits, wherein the fifth reset operation is performed in the second measurement-basis;

performing a sixth reset operation on a second transmission qubit of the second set of transmission qubits, wherein the sixth reset operation is performed in the first measurement-basis, the second transmission qubit corresponds to each of the third measure qubit and the fourth measure qubit, and the first transmission qubit corresponds to the second transmission qubit via the first one-to-one correspondence, and wherein the first measure qubit corresponds to the third measure qubit via the second one-to-one correspondence and the second measure qubit corresponds to the fourth measure qubit via the second one-to-one correspondence.

17. The method of claim 16, wherein:

a first entangled-qubit pair of the first set of entangled qubit pairs includes the third measure qubit and the second transmission qubit; and a second entangled-qubit pair of the second set of entangled qubit pairs includes the first measure qubit and the first transmission qubit.

18. The method of claim 1, the method further comprising:

performing a transversal multi-qubit logic gate between the first LQ and the second LQ by employing local qubit-interactions across the fused LQ.

19. The method of claim 1, wherein the QEC code is a surface code.

20. A computing system, comprising:

a first set of physical qubits (PQs) that forms a first logical qubit (LQ);

a second set of PQs that forms a second LQ;

one or more processor devices;

one or more memory devices, the one or more memory devices storing computer-readable instructions that when executed by the one or more processor devices cause the one or more processor devices to perform operations for implementing fault-tolerant quantum computing, the operations comprising:

entangling a first subset of the first set of PQs with a second subset of the second set of PQs such that a first set of entangled qubit-pairs is formed and the first set of entangled qubit-pairs is distributed across the first subset of PQs and the second subset of PQs;

forming a fused LQ that includes the first LQ and the second LQ, wherein the fused LQ further includes a set of fused stabilizers that spans the first LQ and the second LQ, and wherein at least a subset of the first set of entangled qubit-pairs is employed as a set of fused-measure qubits for the set of fused stabilizers; and implementing a quantum error correction (QEC) code on the fused LQ, wherein the QEC code employs the set of fused stabilizers.

* * * * *